(12) United States Patent
Kitamura et al.

(10) Patent No.: US 7,809,173 B2
(45) Date of Patent: Oct. 5, 2010

(54) FACE DETECTION METHOD, APPARATUS, AND PROGRAM

(75) Inventors: Yoshiro Kitamura, Kanagawa-ken (JP); Wataru Ito, Kanagawa-ken (JP)

(73) Assignee: Fujifilm Corporation (JP)

( * ) Notice: Subject to any disclaimer, the term of this patent is extended or adjusted under 35 U.S.C. 154(b) by 1009 days.

(21) Appl. No.: 11/589,888

(22) Filed: Oct. 31, 2006

(65) Prior Publication Data

US 2007/0122010 A1      May 31, 2007

(30) Foreign Application Priority Data

Nov. 1, 2005      (JP) .............................. 2005-317967

(51) Int. Cl.
    G06K 9/00      (2006.01)
    G06K 9/36      (2006.01)
(52) U.S. Cl. ....................................... 382/118; 382/289
(58) Field of Classification Search ................ 382/118, 382/216, 286, 289

See application file for complete search history.

(56) References Cited

U.S. PATENT DOCUMENTS

| | | | | |
|---|---|---|---|---|
| 6,148,092 A | * | 11/2000 | Qian | ........................... 382/118 |
| 7,324,671 B2 | * | 1/2008 | Li et al. | ....................... 382/118 |
| 7,502,493 B2 | * | 3/2009 | Ishida | ......................... 382/118 |
| 7,564,486 B2 | * | 7/2009 | Ikeda | ....................... 348/222.1 |
| 2002/0102024 A1 | | 8/2002 | Jones et al. | |
| 2006/0120604 A1 | * | 6/2006 | Kim et al. | .................... 382/181 |

OTHER PUBLICATIONS

Shihong Lao et al., "Fast Omni-Directional Face Detection", MIRU 2004, pp. II271-II276, Jul. 2004.

* cited by examiner

*Primary Examiner*—Daniel G Mariam
(74) *Attorney, Agent, or Firm*—Studebaker & Brackett PC; Donald R. Studebaker

(57) ABSTRACT

When detecting a face included in an input image by use of at least two inclinations of the face to be detected, a first detection process is performed if the inclination of the face to be detected corresponds to a first inclination where a relatively high face detection probability is expected, and a second detection process having a relatively low face detection probability and a relatively short processing time compared with the first detection process is performed if the inclination of the face to be detected is other than the first inclination. When an input image is scanned to enable the change in face detection processes according to the position of the face to be detected, a different detection process is used according to the face detection probability of the position of the face to be detected.

30 Claims, 18 Drawing Sheets

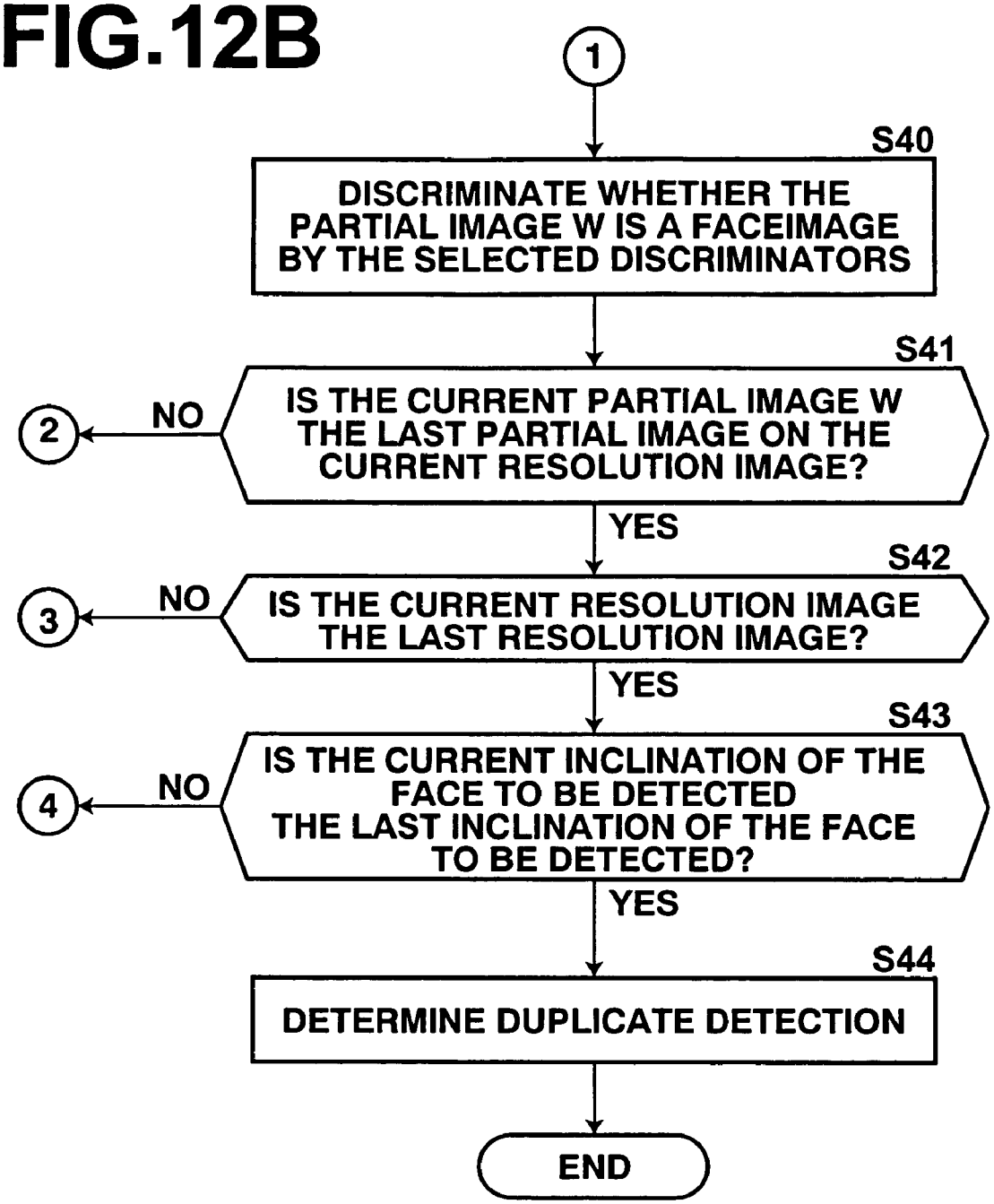

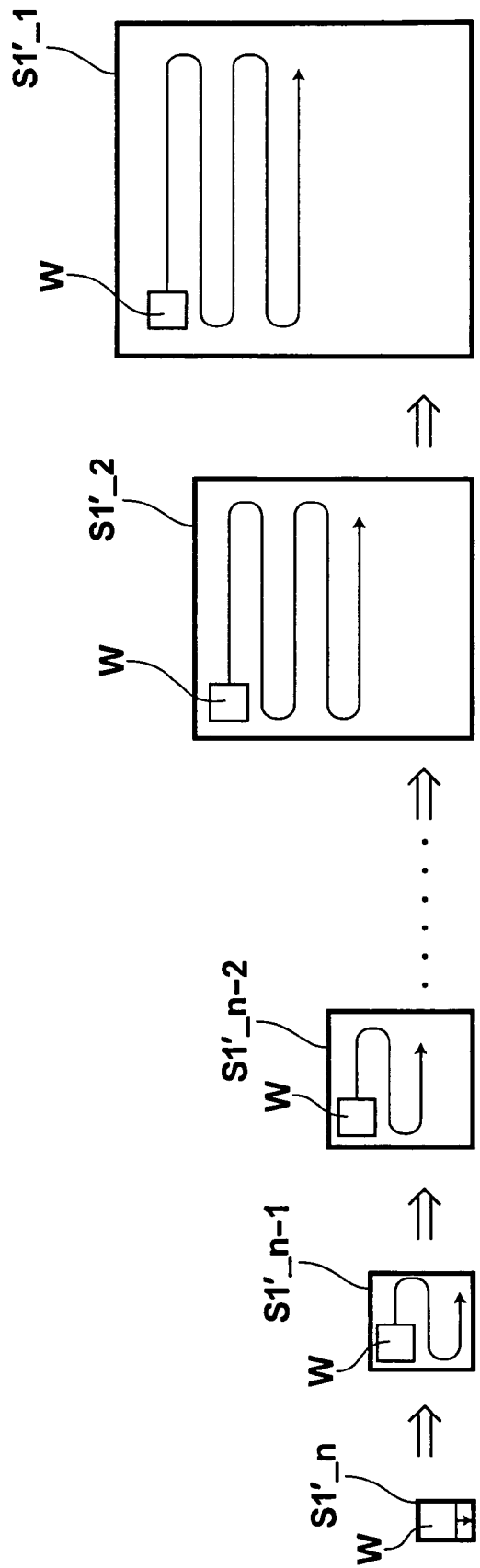

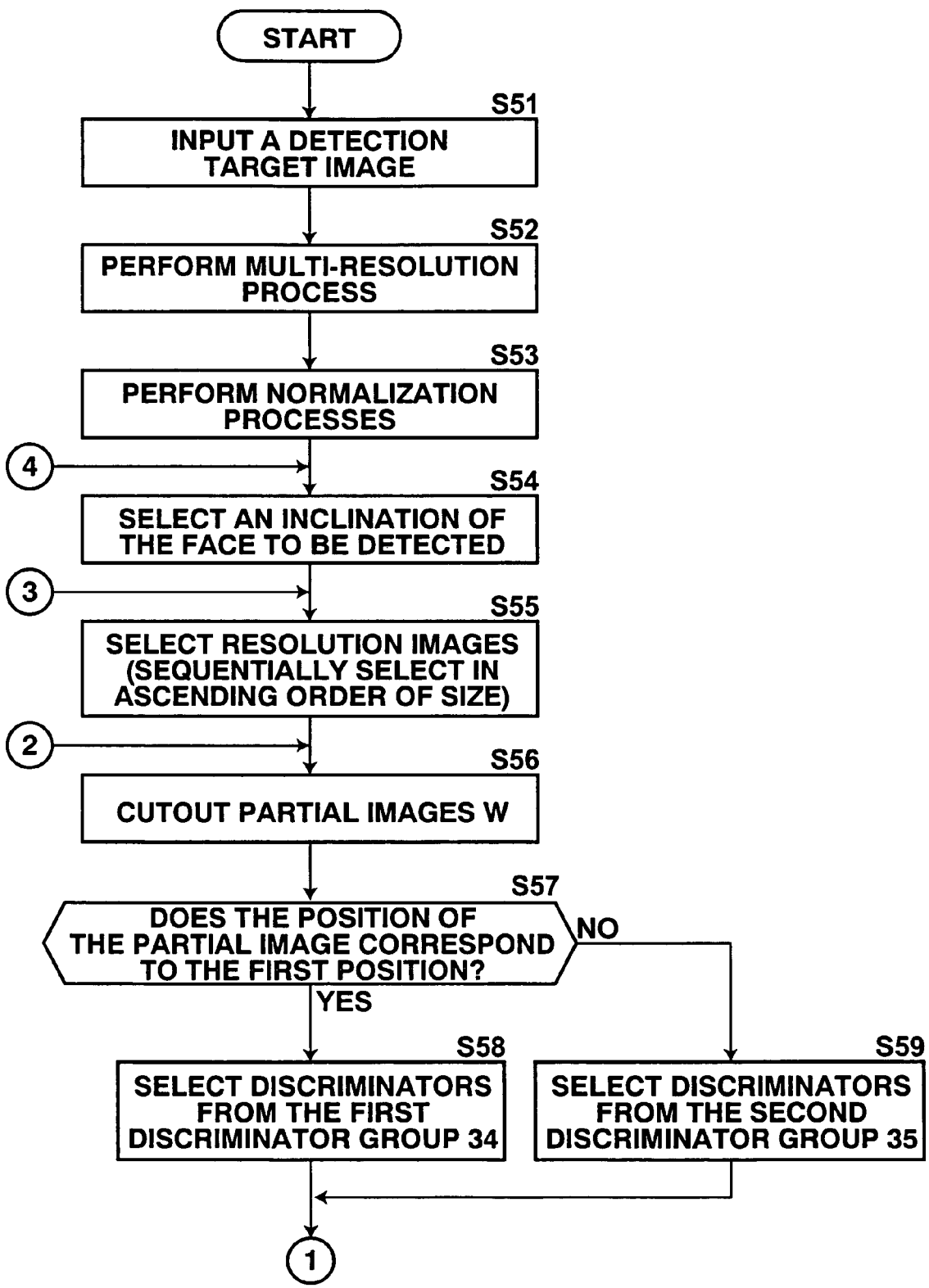

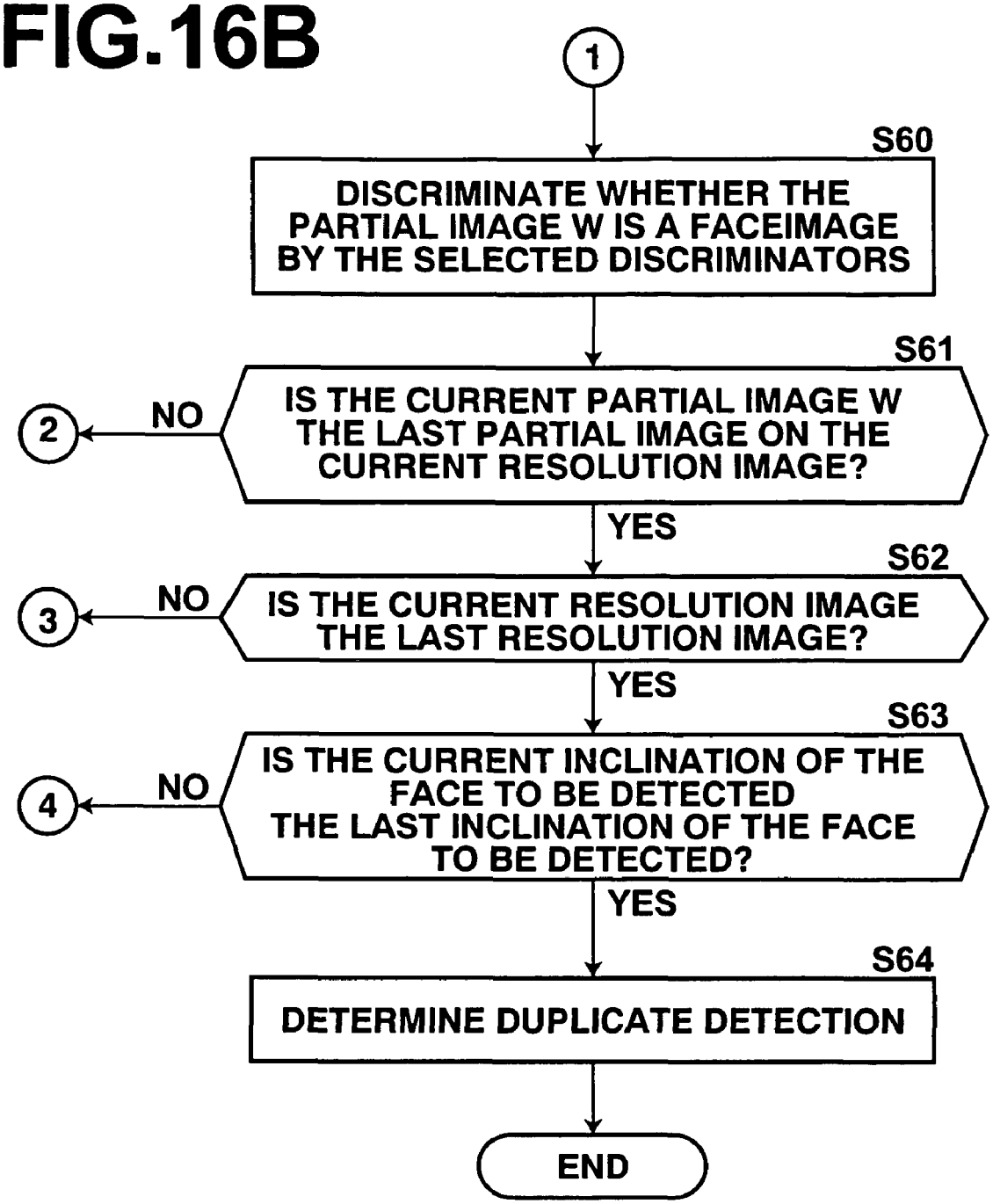

FACE DETECTION METHOD, APPARATUS, AND PROGRAM

BACKGROUND OF THE INVENTION

1. Field of the Invention

The present invention relates to a face detection method and apparatus for detecting a face image that includes a face from a digital image. The present invention also relates to a program for causing a computer to function as the face detection apparatus.

2. Description of the Related Art

Face detection techniques for detecting faces included in digital images have been studied in various fields, in particular, in the fields of image correction, security system, digital camera control, and the like, and different types of face detection methods are proposed. One such method is proposed as described, for example, in U.S. Patent Application Publication No. 20020102024, and non-patent literature "Fast Omni-Directional Face Detection", Shihong LAO et al., MIRU 2004, pp. II271-II276, Jul. 2004. In the method, a sub-window on a digital image is scanned to sequentially determine whether the image displayed on the sub-window is an image that includes a face using a discriminator, and thereby the face included in the digital image is detected.

Generally, a face included in a digital image has unspecified inclination (rotational position of the face on the image), orientation (face orientation in the right and left bobbing direction), size, position, and the like, except for special cases, such as ID photos and the like. Therefore, it is often the case that a face included in a digital image is detected while varying the detection conditions, including the inclination, orientation, size, position, and the like of the face to be detected.

In the mean time, in the face detection method for detecting a face included in a digital image, a high face detection probability (fewer detection failures) with a short processing time is desirable.

In the methods in which the face is detected while varying the detection conditions, however, increased face detection probability (decreased detection failures) tends to longer processing time, since detection conditions need to be specified finely, while increased processing time tends to decreased detection probability (more detection failures), since the detection conditions need to be specified coarsely. That is, the face detection probability (extent of detection failures) is in the so-called trade-off relationship with the processing time. Therefore, it is difficult to satisfy both high detection probability (fewer detection failures) and short processing time. Consequently, it has been a challenge to increase the face detection probability while at the same time reducing the processing time as much as possible.

In view of the circumstances described above, it is an object of the present invention to provide a face detection method and apparatus capable of improving face detection probability with reduced processing time in the face detection process for detecting a face included in an image. It is a further object of the present invention to provide a program for causing a computer to function as the face detection apparatus.

SUMMARY OF THE INVENTION

A first face detection method of the present invention is a face detection method for detecting a face included in an input image by use of at least two inclinations of the face to be detected. In the method, a first detection process is performed if the inclination of the face to be detected corresponds to a first inclination where a relatively high face detection probability is expected, and a second detection process having a relatively low face detection probability and a relatively short processing time compared with the first detection process is performed if the inclination of the face to be detected is other than the first inclination.

In the first face detection method of the present invention, the first inclination may be, for example, an inclination substantially corresponding to the vertical or horizontal direction of the input image.

Further, in the first face detection method of the present invention, two different types of detectors, a first detector for performing the first detection process, and a second detector for performing the second detection process, may be provided in advance for each inclination of the face to be detected, and either the first or second detection process may be performed by selecting and using either of the two different types of detectors according to the inclination of the face to be detected.

Still further, in the first face detection method of the present invention, each of the first and second detection processes may perform detection while varying the position of the face to be detected on the input image every time by a predetermined amount of variance. Here, the first detection process may be a detection process with a relatively small amount of variance in the position of the face to be detected, and the second detection process may be a detection process with a relatively large amount of variance in the position of the face to be detected.

Further, in the first face detection method of the present invention, each of the first and second detection processes may perform detection while varying the size of the face to be detected every time by a predetermined amount of variance. Here, the first detection process may be a detection process with a relatively small amount of variance in the size of the face to be detected, and the second detection process may be a detection process with a relatively large amount of variance in the size of the face to be detected.

A second face detection method of the present invention is a face detection method in which an input image is scanned to enable the change in face detection processes according to the position of the face to be detected. In the method, a first detection process is performed if the position of the face to be detected corresponds to a first position where a relatively high face detection probability is expected, and a second detection process having a relatively low face detection probability and a relatively short processing time compared with the first detection process is performed if the position of the face to be detected is other than the first position.

In the second face detection method of the present invention, the first position may be, for example, a position within a predetermined region of the input image including the center thereof.

Further, in the second face detection method of the present invention, each of the first and second detection processes may perform detection while varying the position of the face to be detected every time by a predetermined amount of variance. Here, the first detection process may be a detection process with a relatively small amount of variance in the position of the face to be detected, and the second detection process may be a detection process with a relatively large amount of variance in the position of the face to be detected.

Still further, in the second face detection method of the present invention, each of the first and second detection processes may perform detection while varying the size of the face to be detected every time by a predetermined amount of variance. Here, the first detection process may be a detection process with a relatively small amount of variance in the size of the face to be detected, and the second detection process may be a detection process with a relatively large amount of variance in the size of the face to be detected.

In the first and second face detection methods of the present invention, each of the first and second detection processes may use a discriminator that includes a plurality of different types of weak classifiers connected in cascade for cutting out a partial image at the position of the face to be detected, calculating an index value that indicates the probability that the partial image is a face image based on the characteristic amounts of the image of the partial image, and discriminating whether the partial image is a face image based on a threshold for the index value, to discriminate whether the partial image is a face image. Here, the first detection process may be a detection process with a relatively low threshold for the index value, and the second detection process may be a detection process with a relatively high threshold for the index value.

A first face detection apparatus of the present invention is an apparatus for detecting a face included in an input image by use of at least two inclinations of the face to be detected. The apparatus includes a detection means that performs a first detection process if the inclination of the face to be detected corresponds to a first inclination where a relatively high face detection probability is expected, and a second detection process having a relatively low face detection probability and a relatively short processing time compared with the first detection process if the inclination of the face to be detected is other than the first inclination.

In the first face detection apparatus of the present invention, the first inclination may be, for example, an inclination substantially corresponding to the vertical or horizontal direction of the input image.

Further, in the first face detection apparatus of the present invention, the detection means may include two different types of detectors, a first detector for performing the first detection process, and a second detector for performing the second detection process. Here, either the first or second detection process may be performed by selecting and using either of the two different types of detectors according to the inclination of the face to be detected.

Still further, in the first face detection apparatus of the present invention, each of the first and second detection processes may perform detection while varying the position of the face to be detected on the input image every time by a predetermined amount of variance. Here, the first detection process may be a detection process with a relatively small amount of variance in the position of the face to be detected, and the second detection process may be a detection process with a relatively large amount of variance in the position of the face to be detected.

Further, in the first face detection apparatus of the present invention, each of the first and second detection processes may perform detection while varying the size of the face to be detected every time by a predetermined amount of variance. Here, the first detection process may be a detection process with a relatively small amount of variance in the size of the face to be detected, and the second detection process may be a detection process with a relatively large amount of variance in the size of the face to be detected.

A second face detection apparatus of the present invention is an apparatus that performs detection by scanning an input image and changing the position of the face to be detected on the input image. The apparatus includes a detection means that performs a first detection process if the position of the face to be detected corresponds to a first position where a relatively high face detection probability is expected, and a second detection process having a relatively low face detection probability and a relatively short processing time compared with the first detection process if the position of the face to be detected is other than the first position.

In the second face detection apparatus of the present invention, the first position may be, for example, a position within a predetermined region of the input image including the center thereof.

Further, in the second face detection apparatus of the present invention, each of the first and second detection processes may perform detection while varying the position of the face to be detected on the input image every time by a predetermined amount of variance. Here, the first detection process may be a detection process with a relatively small amount of variance in the position of the face to be detected, and the second detection process may be a detection process with a relatively large amount of variance in the position of the face to be detected.

Still further, in the second face detection apparatus of the present invention, each of the first and second detection processes may perform detection while varying the size of the face to be detected every time by a predetermined amount of variance. Here, the first detection process may be a detection process with a relatively small amount of variance in the size of the face to be detected, and the second detection process may be a detection process with a relatively large amount of variance in the size of the face to be detected.

In the first and second face detection apparatuses, each of the first and second detection processes may use a discriminator that includes a plurality of different types of weak classifiers connected in cascade for cutting out a partial image at the position of the face to be detected, calculating an index value that indicates the probability that the partial image is a face image based on the characteristic amounts of the image of the partial image, and discriminating whether the partial image is a face image based on a threshold for the index value, to discriminate whether the partial image is a face image. Here, the first detection process may be a detection process with a relatively low threshold for the index value, and the second detection process may be a detection process with a relatively high threshold for the index value.

A first program of the present invention is a program for causing a computer to function as a face detection apparatus for detecting a face included in an input image by use of at least two inclinations of the face to be detected. Here, the program causes the computer to function as a detection means that performs a first detection process if the inclination of the face to be detected corresponds to a first inclination where a relatively high face detection probability is expected, and a second detection process having a relatively low face detection probability and a relatively short processing time compared with the first detection process if the inclination of the face to be detected is other than the first inclination.

In the first program of the present invention, the first inclination may be, for example, an inclination substantially corresponding to the vertical or horizontal direction of the input image.

Further, in the first program of the present invention, two different types of detectors, a first detector for performing the first detection process, and a second detector for performing the second detection process, may be provided for each inclination of the face to be detected. Here, either the first or second detection process may be performed by selecting and using either of the two different types of detectors according to the inclination of the face to be detected.

Still further, in the first program of the present invention, each of the first and second detection processes may perform detection while varying the position of the face to be detected on the input image every time by a predetermined amount of variance. Here, the first detection process may be a detection process with a relatively small amount of variance in the position of the face to be detected, and the second detection process may be a detection process with a relatively large amount of variance in the position of the face to be detected.

Further, in the first program of the present invention, each of the first and second detection processes may perform detection while varying the size of the face to be detected every time by a predetermined amount of variance. Here, the first detection process may be a detection process with a relatively small amount of variance in the size of the face to be detected, and the second detection process may be a detection process with a relatively large amount of variance in the size of the face to be detected.

A second program of the present invention is a program for causing a computer to function as a face detection apparatus in which an input image is scanned to enable the change in face detection processes according to the position of the face to be detected. Here, the program causes the computer to function as a detection means that performs a first detection process if the position of the face to be detected corresponds to a first position where a relatively high face detection probability is expected, and a second detection process having a relatively low face detection probability and a relatively short processing time compared with the first detection process if the position of the face to be detected is other than the first position.

In the second program of the present invention, the first position may be, for example, a position within a predetermined region of the input image including the center thereof.

Further, in the second program of the present invention, each of the first and second detection processes may perform detection while varying the position of the face to be detected every time by a predetermined amount of variance. Here, the first detection process may be a detection process with a relatively small amount of variance in the position of the face to be detected, and the second detection process may be a detection process with a relatively large amount of variance in the position of the face to be detected.

Still further, in the second program of the present invention, each of the first and second detection processes may perform detection while varying the size of the face to be detected every time by a predetermined amount of variance. Here, the first detection process may be a detection process with a relatively small amount of variance in the size of the face to be detected, and the second detection process may be a detection process with a relatively large amount of variance in the size of the face to be detected.

In the first and second programs of the present invention, each of the first and second detection processes may use a discriminator that includes a plurality of different types of weak classifiers connected in cascade for cutting out a partial image at the position of the face to be detected, calculating an index value that indicates the probability that the partial image is a face image based on the characteristic amounts of the image of the partial image, and discriminating whether the partial image is a face image based on a threshold for the index value, to discriminate whether the partial image is a face image. Here, the first detection process may be a detection process with a relatively low threshold for the index value, and the second detection process may be a detection process with a relatively high threshold for the index value.

The referent of "inclination of the face" as used herein means the inclination of the face in the so-called in-plane direction. In other words, it means a rotational position of the face on the image.

The referent of "an inclination substantially corresponding to the vertical or horizontal direction of the input image" as used herein means an inclination within a predetermined rotational angle range from the vertical or horizontal direction of the input image. For example, the rotational angle range may be ±30 degrees from the vertical or horizontal direction of the input image.

The referent of "connected in cascade" as used herein means a connection scheme in which a plurality of weak classifiers is connected in series to perform the face discrimination in the following manner. That is, only when a partial image is discriminated to be a face image by the top weak classifier through to the weak classifier before last, the face discrimination is performed by the last weak classifier, and if the partial image is discriminated to be a face image by the last weak classifier, the partial image is concluded to be a face image. If the partial image is discriminated to be a non-face image partway, the discrimination process is withdrawn without performing face discrimination by the subsequent weak classifiers. Consequently, the detection process using a discriminator constituted by weak classifiers connected in cascade has operational properties that it has a relatively high face detection probability (fewer detection failures) and a relatively long processing time if the threshold of the weak classifiers is set high, and a relatively low face detection probability (more detection failures) with a relatively short processing time if the threshold of the weak classifiers is set low.

The discriminators that may be used in the present invention may include those learned through the so-called machine learning methods. For example, those learned through the method known as "Boosting", in particular, those learned through the AdaBoost learning algorithm may be used.

According to the first face detection method, apparatus and program, in detecting a face included in an input image by use of at least two inclinations of the face to be detected, a first detection process is performed if the inclination of the face to be detected corresponds to a first inclination where a relatively high face detection probability is expected, and a second detection process having a relatively low face detection probability and a relatively short processing time compared with the first detection process is performed if the inclination of the face to be detected is other than the first inclination. This allows the detection process having a relatively long processing time and relatively fewer detection failures may be concentrated on the conditions where a relatively high face detection probability is expected, so that the face detection probability may be increased with reduced processing time as much as possible.

According to the second face detection method, apparatus and program, in detecting a face while varying the position of the face to be detected, a first detection process is performed if the position of the face to be detected corresponds to a first position where a relatively high face detection probability is expected, and a second detection process having a relatively low face detection probability and a relatively short processing time compared with the first detection process is performed if the position of the face to be detected is other than the first position. This allows the detection process having a relatively long processing time and relatively fewer detection failures may be concentrated on the conditions where a relatively high face detection probability is expected, so that the face detection probability may be increased with reduced processing time as much as possible.

BRIEF DESCRIPTION OF THE DRAWINGS

FIG. 12B is a flowchart illustrating the process performed in the face detecting system 1 according to a first embodiment (second half).

FIG. 13 is a drawing for illustrating the switching of resolution images, which are target images for face detection, and the movement of a sub-window on the images.

FIG. 16A is a flowchart illustrating the process performed in the face detection system 1 according to a second embodiment (first half).

FIG. 16B is a flowchart illustrating the process performed in the face detection system 1 according to a second embodiment (second half).

DESCRIPTION OF THE PREFERRED EMBODIMENTS

Hereinafter, exemplary embodiments of the present invention will be described.

First, a face detection system, which is a first embodiment of the face detection apparatus of the present invention, will be described.

Figure 1:
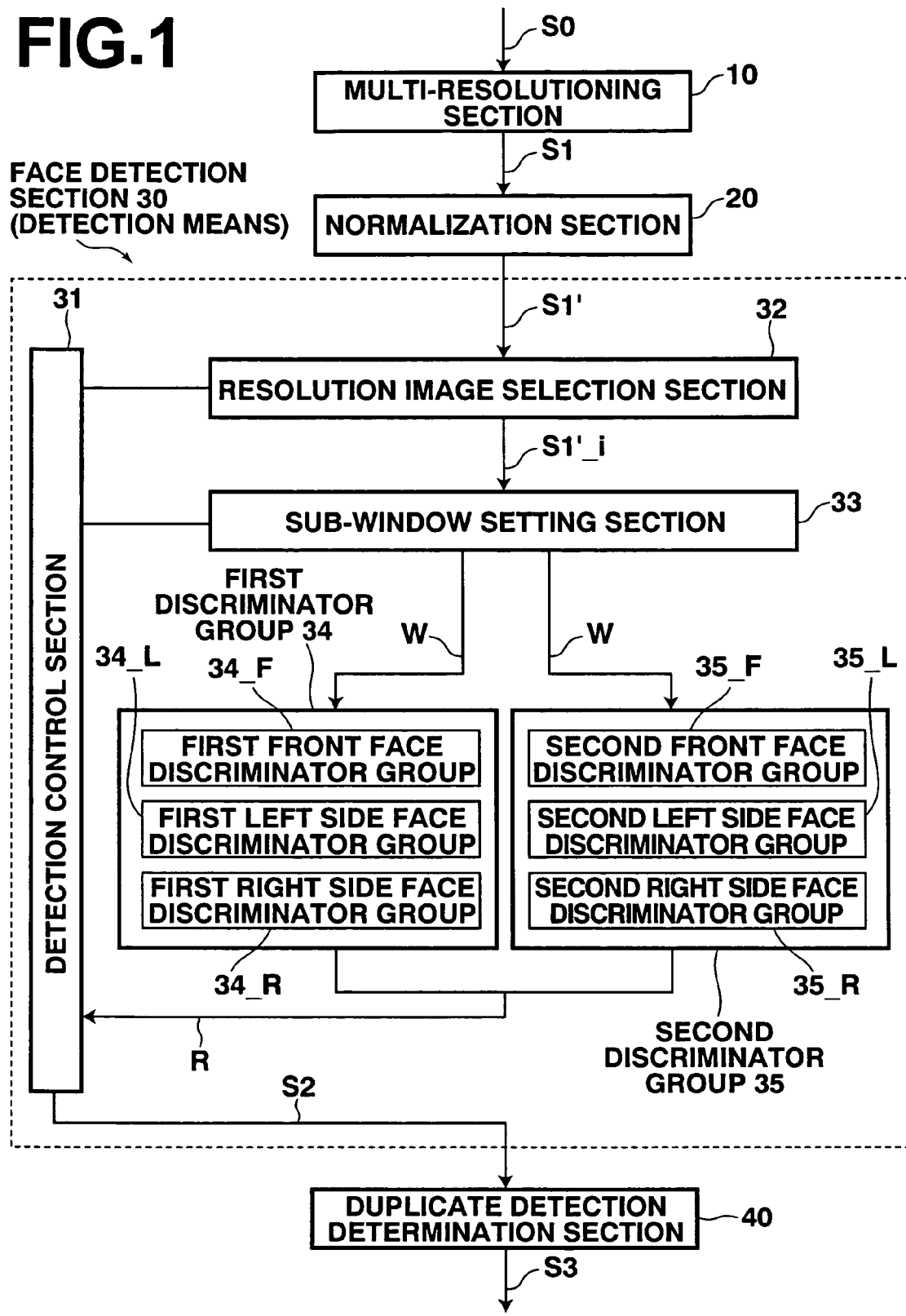
FIG. 1 is a block diagram of a face detection system 1 illustrating a first example of the configuration thereof.

FIG. 1 is a schematic block diagram of the face detection system 1 according to the first embodiment, illustrating the schematic configuration thereof. The face detection system 1 is a system that detects an image that includes a face (hereinafter "face image") from a digital image regardless of the position, size, or inclination (inclination in the in-plane direction) of the face. The face detection system 1 employs a method that uses a discriminator module (hereinafter, simply "discriminator") generated through machine learning using sample images, which is a face detection method deemed to be superior, in particular, in the detection accuracy and robustness. In the method, a discriminator is generated in advance, which is capable of discriminating whether a certain image is a face image that includes a face with predetermined inclination and orientation. This capability is obtained through learning of face characteristics by the discriminator using a plurality of different face sample images (face sample image group) having faces of similar inclinations and orientations, and a plurality of different groups of non-face sample images (non-face sample image groups) known to be of images other than the face image. Then, partial images are sequentially cut out from the image which is the target image for detecting a face image (hereinafter, "detection target image"), and each partial image is discriminated by the discriminator to determine whether it is a face image, thereby the face on the detection target image is detected.

As shown in FIG. 1, the face detection system 1 includes: a multi-resolutioning section 10; a normalization section 20, a face detection section (detection means) 30; and a duplicate detection determination section 40.

The multi-resolutioning section 10 obtains a resolution image group S1 constituted by a plurality of images having different resolutions (S1_1, S1_2, - - - S1_$n$, hereinafter, "resolution images") obtained by performing a multi-resolution process on an inputted detection target image (input image) S0.

The image size of the detection target image S0 is transformed, that is, the resolution thereof is transformed to standardize the image, for example, to an image having a rectangular size with a short side of 416 pixels to obtain a normalized detection target image S0'. Then, based on the standardized detection target image S0', transformation of the resolution is further performed to generate a plurality of resolution images having different resolutions, thereby the resolution image group S1 is obtained. The reason for generating such resolution image group is that the size of the face included in the detection target image S0 is normally unknown, while the size of the face tried to be detected is fixed to a certain size in connection with the generation method of the discriminator to be described later. Thus, in order to detect the face having a different size, it is necessary to cut out a partial image having a predetermined size by moving the position thereof on the images having different resolutions, and to determine whether the partial image is a face image.

Figure 2:
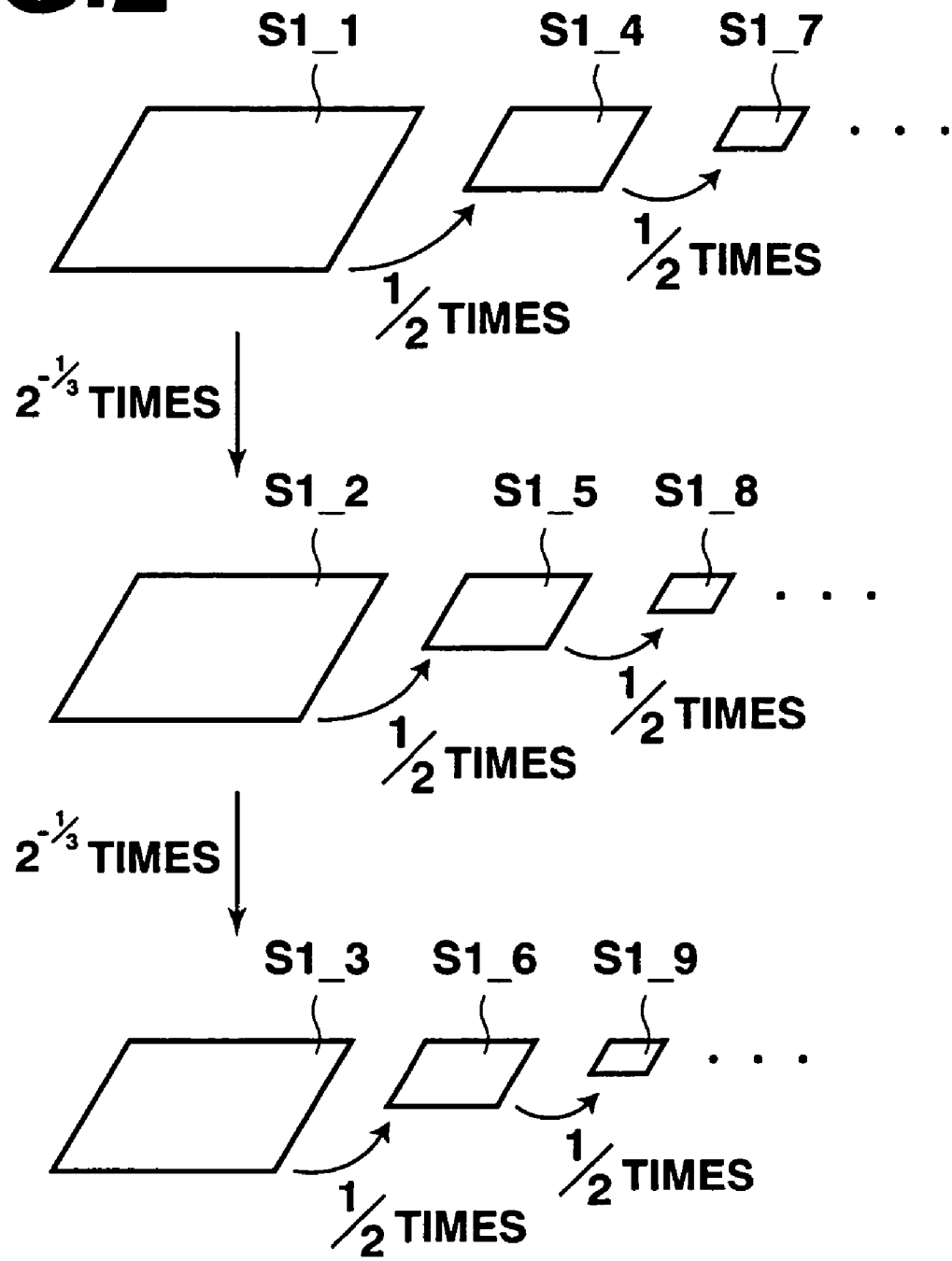
FIG. 2 is a drawing illustrating a multi-resolution process for an image from which a face is to be detected.

FIG. 2 illustrates a multi-resolution process for a detection target image. The multi-resolutioning, that is, the generation of the resolution image group is implemented in the following steps as shown in FIG. 2. More specifically, the standardized detection target image S0' is designated as the basic resolution image S1_1. Then, an image having a size of $2^{-1/3}$ times that of the resolution image S1_1, and an image having a size of $2^{-1/3}$ times that of the resolution image S1_2 ($2^{-2/3}$ times that of the basic image S1_1) are generated first. Thereafter, an image having a size of ½ of that of each of the resolution images S1_1, S1_2, and S1_3 is generated. Then, an image having a size of ½ of that of each reduce image is further generated. This process is repeated until a predetermined number of resolution images are obtained. This allows a plurality of images reduced in stepwise, every time by $2^{-1/3}$ times, from a basic resolution image to be generated rapidly mainly through ½ image reducing operation that does not require interpolation for the pixel values representing luminance. For example, when the resolution image S1_1 has a rectangular size with a short side of 416 pixels, the resolution images S1_2, S1_3, - - - S1_n have a rectangular size with a short side of 330 pixels, 262 pixels, 208 pixels, 165 pixels, 131 pixels, 104 pixels, 65 pixels, - - - respectively, thereby a plurality of images reduced in stepwise, every time by $2^{-1/3}$ times, may be generated. The images generated without the pixel values being interpolated are preferable for use in the face detection process, since they tend to maintain the characteristics of the original image pattern and thereby improvement of the image detection accuracy may be expected.

The normalization section 20 performs overall and local normalization processes on each resolution image such that the resolution images have an appropriate contrast for face detection to obtain a resolution image group S1' constituted by a plurality of normalized resolution images (S1'_1, S1'_2, - - - S1'_n).

First, the overall normalization process will be described. The overall normalization process is a process for transforming the contrast of the resolution image to a predetermined level appropriate for face detection. That is, it is a process for performing the transformation according to a transformation curve for approximating the pixel values of the entire resolution image to the values representing the logarithm of the luminance of the subject in the image so that the contrast of the resolution image is approximated to a level appropriate for extracting high performance of the discriminator to be described later.

Figure 3:
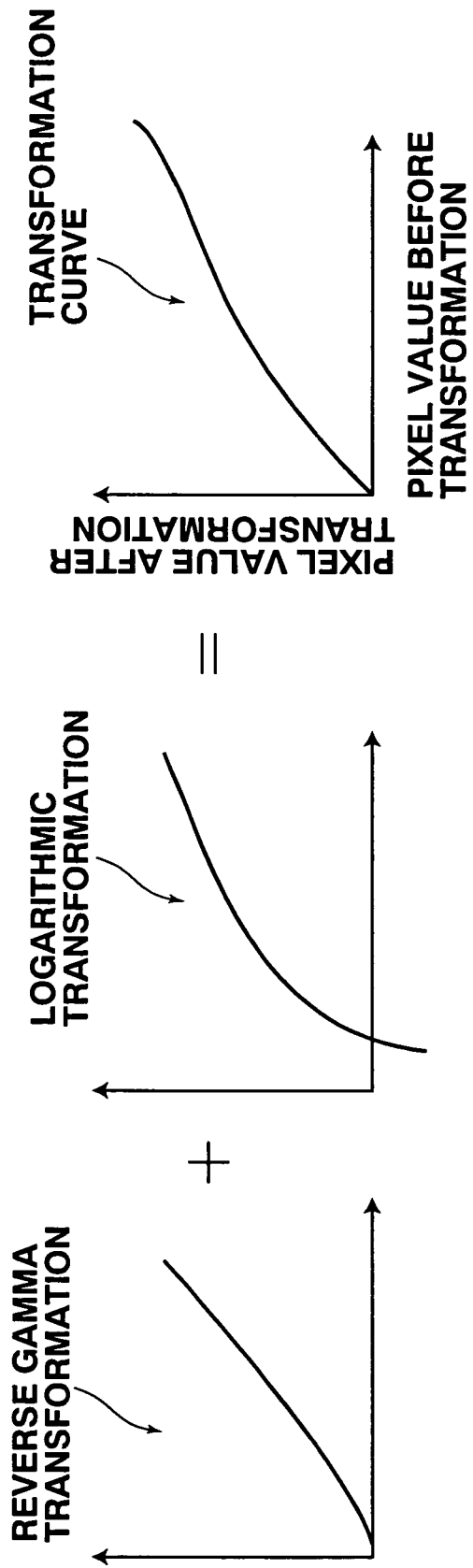
FIG. 3 is a drawing illustrating an example transformation curve used for an overall normalization process.

FIG. 3 is a drawing illustrating an example transformation curve used for the overall normalization process. As for the overall normalization process, for example, a process for transforming the pixel values of entire image according to a transformation curve (lookup table) like that shown in FIG. 3 obtained through so-called the reverse γ transformation on the pixel values in sRGB space (raising the values to the power of 2.2) and further taking the logarithm thereof may be used. This is because of the following reasons.

Generally, the light intensity I observed as an image may be described as the product of the reflectance R of the subject and the intensity L of the light source (I=R×L). Thus, if the intensity L of the light source changes, the light intensity I observed as an image also changes. If only the reflectance R of the subject is allowed to be evaluated, however, highly accurate face discrimination may be performed without depending on the intensity L of the light source, i.e., without influenced by the luminance of the image.

Here, when the intensity of the light source is L, and the light intensities observed from the subject areas having a reflectance of R1 and R2 are I1 and I2 respectively, the following formula holds true in the logarithmic space thereof.

$$\text{Log}(I1)-\log(I2)=\log(R1 \times L)-\log(R2 \times L)=\log(R1)+\log(L)-(\log(R2)+\log(L))=\log(R1)-\log(R2)=\log(R1/R2)$$

That is, the logarithmic transformation of the pixel values of an image means that the image is transformed into a space in which the reflectance ratio is represented as the difference. In such space, only the reflectance of the subject that does not dependent on the intensity L of the light source may be evaluated. In other words, the contrast in an image that differs according to the luminance (here, the difference itself of the pixel values) may be adjusted.

In the mean time, the color space of an image obtained by a device such as a common digital camera or the like is sRGB. sRGB is an international color space standard that defines/ standardizes color, saturation, and the like, in order to standardize the difference in color reproducibility between the devices. In the sRGB color space, the pixel value of an image corresponds to the input luminance raised to the power of 1/γ out (=0.45) to enable image output devices having a gamma value of 2.2 to reproduce color appropriately.

Thus, by performing transformation according to a transformation curve obtained through the so-called reverse γ transformation on the pixel values of the entire image, i.e., raising the values to the power of 2.2, and further taking the logarithm thereof, evaluation of the subject based only on the reflectance that does not depend on the luminance may be properly performed.

The overall normalization process, to put it another way, is a process for transforming the pixel values of the entire image according to a transformation curve for transforming a certain color space to another having different characteristics. Performance of such process on the detection target image allows the contrast of an image that differs according to the luminance to be adjusted, and thereby the accuracy of the face detection may be improved. The overall normalization process has properties that the results tend to be influenced by the difference in oblique rays and background of the detection target image, input modality, and the like, but has a short processing time.

Hereinafter, the local normalization process will be described. The local normalization process is a process for minimizing the contrast variance in the local regions on the resolution image. That is, for each of the local regions on the resolution image, the process performs a first luminance gradation transformation process for the local region where the extent of the variance of the pixel values representing the luminance is higher than or equal to a predetermined level to approximate the extent of variance to a certain level which is higher than the predetermined level, and a second luminance gradation transformation process for the local region where the extent of the variance of the pixel values is smaller than the predetermined level to suppress the extent of the variance to a level which is lower than the certain level described above. The local normalization process requires a relatively longer processing time, but the discrimination results are not influenced so much by the difference in oblique rays and background of the detection target image, input modality, and the like.

Figure 4:
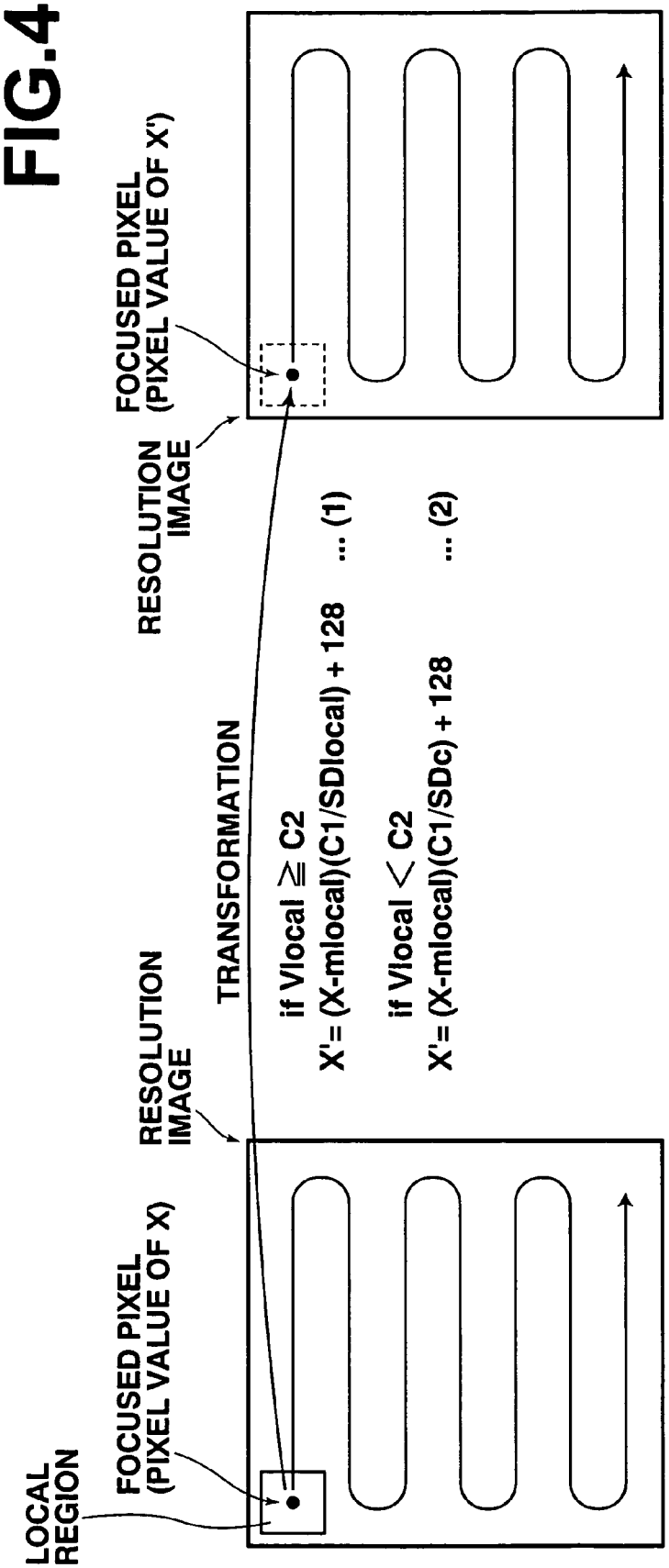
FIG. 4 is a drawing illustrating the concept of a local normalization process.
Figure 5:
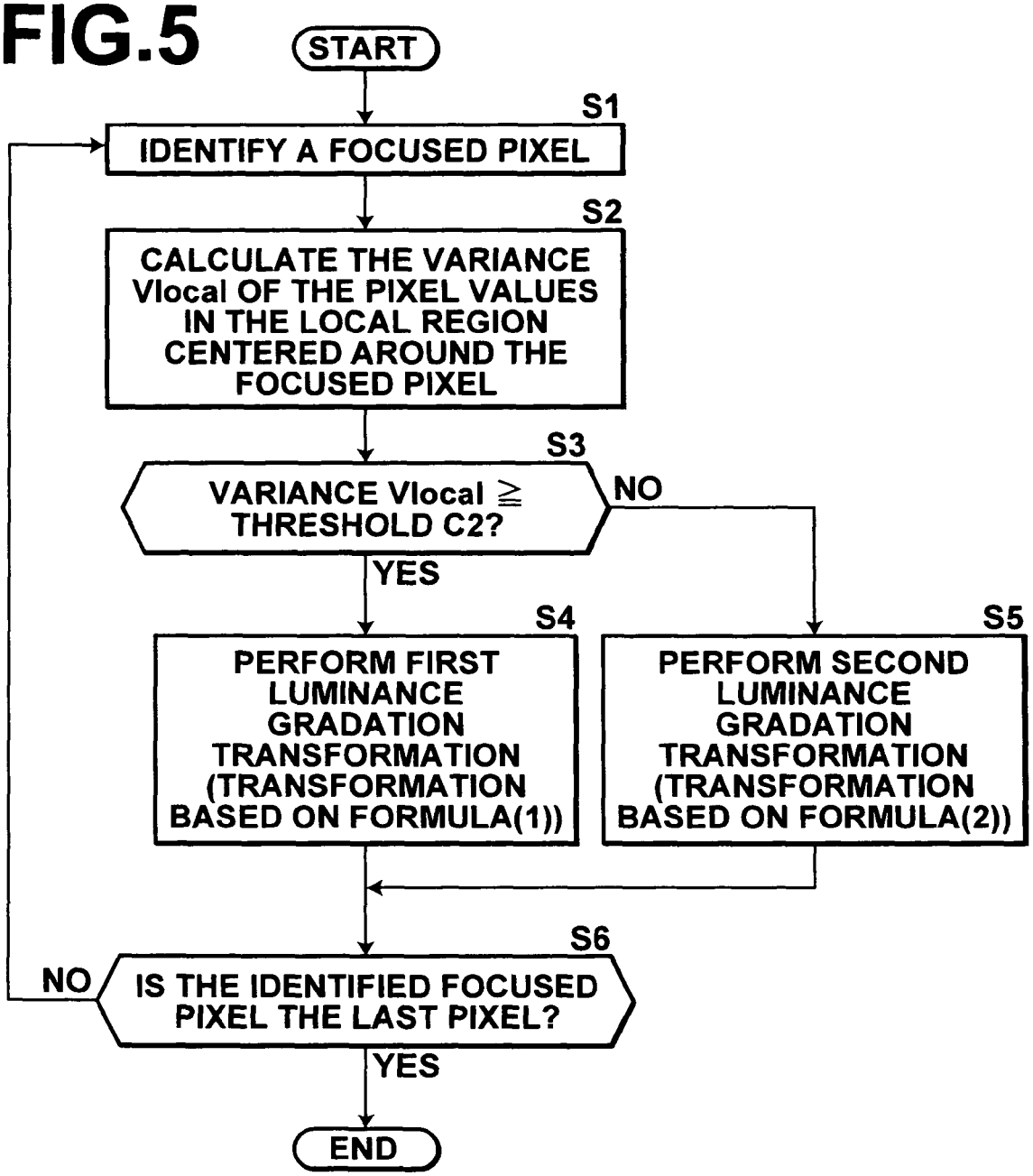
FIG. 5 is a drawing illustrating the flow of the local normalization process.

FIG. 4 is a drawing illustrating the concept of the local normalization process, and FIG. 5 is a drawing illustrating the flow of the local normalization process. The following Formulae (1) and (2) are luminance gradation transformation formulae of pixel values for the local normalization process.

if Vlocal≧C2

$$X'=(X-m\text{local})(C1/SD\text{local})+128 \quad (1)$$

if Vlocal<C2

$$X'=(X-m\text{local})(C1/SDc)+128 \quad (2)$$

where:
X: pixel value of focused pixel
X': pixel value after transformation
mlocal: average of the pixel values in a local region centered around the focused pixel
Vlocal: variance of the pixel values in the local region
SDlocal: standard deviation of the pixel values in the local region
(C1'C1): reference value
C2: threshold
SDc: constant Here, X is the pixel value of a focused pixel, X' is the pixel value of the focused pixel after transformation, mlocal is the average of the pixel values in the local region centered around the focused pixel, Vlocal is the variance of the pixel values in the local region, SDlocal is the standard deviation of the pixel values in the local region, (C1×C1) is a reference value corresponding to the certain level described above, C2 is a threshold corresponding to the predetermined level described above, and SDc a predetermined constant. Here, in the present embodiment, an assumption is made that the luminance gradation is represented by 8 bits and the possible pixel values range from 0 to 255.

As shown in FIG. 5, one pixel in a resolution image is identified as the focused pixel (step S1), and the variance Vlocal of the pixel values in the local region centered around the focused pixel having a predetermined size, for example, 11×11 pixel size is calculated (step S2) to determine whether the variance Vlocal is greater than or equal to the threshold C2 corresponding to the predetermined level described above (step S3). If the variance Vlocal is determined to be greater than or equal to the threshold C2 corresponding to the predetermined level in step S3, a gradation transformation process is performed such that the greater the variance Vlocal with respect to the reference value (C1×C1) the smaller the difference between the pixel value X of the focused pixel and average mlocal, and the smaller the variance mlocal with respect to the reference value (C1×C1) the greater the difference between the pixel value X of the focused pixel and average mlocal according to Formula (1) as the first luminance gradation transformation process described above (step S4). If the variance Vlocal is determined to be smaller than the threshold C2 in step S3, a linear gradation transformation process that does not depend on the variance Vlocal is performed according to Formula (2) as the second luminance gradation transformation process described above (step S5). Then, a determination is made whether the pixel identified in step S1 is the last pixel (step S6). If the determination result in step S6 is negative, the process returns to step S1, and the next pixel on the same resolution image is identified as the focused pixel. On the other hand, if the determination result in step S6 is positive, the local normalization process for the resolution image is terminated. By repeating steps S1 to S6 in the manner as describe above, the local normalization process may be performed on the entire resolution image.

The predetermined level described above may be changed according to the luminance of the entire or part of the local region. For example, in the normalization process in which the gradation transformation process is performed for each focused pixel as described above, the threshold C2 may be changed according to the pixel value of the focused pixel. That is, the threshold C2 corresponding to the predetermined level described above may be set higher when the luminance of the focused pixel is relatively high, and set lower when the luminance of the focused pixel is relatively low. This allows a low contrast face presenting in a low luminance, i.e. a dark region (state of small variation in pixel values) to be correctly normalized.

Here, it is assumed that the total number of inclinations of the face to be detected is twelve obtained by rotating the face in increments of 30 degrees within the in-plane of the detection target image S0 with respect to the vertical direction of the detection target image S0, and the switching order of the inclinations of the face to be detected is predetermined. For example, the switching order may be indicated by the clockwise rotational angles with respect to the vertical direction of the detection target image S0, like upward three angles of 0, 330, and 30 degrees (0 degree group); rightward three angles of 90, 60, and 120 degrees (90 degree group); leftward three angles of 270, 240, and 300 degrees (270 degree group); and downward three angles of 180, 150, and 210 degrees (180 degree group).

The face detection section 30 performs the face detection process for each of the resolution images of the resolution image group S1' normalized by the normalization section 20 by use of at least two inclinations of the face to be detected according to the predetermined order to detect a face image S2 included in each resolution image. The face detection section 30 further includes a plurality of elements.

FIG. 1 is a block diagram of the face detection section 30 illustrating the schematic configuration thereof. As shown in FIG. 1, the face detection section 30 includes: a detection control section 31; a resolution image selection section 32; a sub-window setting section 33; a first discriminator group 34; and a second discriminator group 35.

The detection control section 31 mainly performs a sequence control in the face detection process through controlling each of other sections constituting the face detection section 30. More specifically, it controls the resolution image selection section 32, sub-window setting section 33, first discriminator group 34, and second discriminator group 35 to cause the following steps to be performed so that the true face image S2 is detected from each resolution image. That is, for each of the resolution images constituting the resolution image group S1', the partial image is sequentially cut out from the entire resolution image; all of a plurality of different types of discriminators, each detecting a face with a different inclination, are applied to the cutout partial image to extract a candidate face image from the resolution image regardless of the inclination of the face; and a determination is made whether each of the extracted candidate face images is a true face image. For example, the detection control section 31 gives an instruction for selecting the resolution image to the resolution image selection section 32, provides sub-window setting conditions to the sub-window setting section 33, or selects the type of the discriminators to be used among the discriminators constituting the first and second discriminator groups 34, 35, as appropriate. The sub-window setting conditions include a range on the image where sub-window is set, a moving distance of the sub-window, i.e. coarseness of the detection, and the like.

The detection control section 31 further controls each section to cause a first detection process having a relatively high face detection probability (fewer detection failures) and a relatively long processing time to be performed if the inclination of the face to be detected corresponds to a first inclination where a relatively high face detection probability is expected according to the empirical rule, or a second detection process having a relatively low face detection probability (more detection failures) and a relatively short processing time compared with the first detection process to be performed if the inclination of the face to be detected is other than the first inclination (hereinafter, the "second inclination").

Although various inclinations may be considered as the first inclination, it is assumed here to be the inclination substantially corresponding to the vertical or horizontal direction of the detection target image S0, and the inclinations of the face to be detected are 0, 90, 180, and 270 degrees here. The reason is that, in general, a photograph image or the like in which a person is imaged as the subject, the inclination of the face of the subject is often corresponds substantially to the vertical or horizontal direction of the image, thus the probability that faces of such inclinations are detected may be considered to be higher than the faces of other inclinations.

The resolution image selection section 32 selects the resolution image to be subjected to the face detection process from the resolution image group S1' in ascending order of the size or descending order of coarseness of the resolution through control by the detection control section 31. The face detection method of the present embodiment is a face detection method in which the face included in the detection target image S0 is detected by discriminating whether each of the partial images of the same size sequentially cut out from each resolution image is a face image. Thus, the resolution image selection section 32 may be regarded as a section that sets the size of the face to be detected while varying the size thereof in the detection target image S0 in descending order.

The sub-window setting section 33 sets a sub-window for cutting out the partial image W, which is a discrimination object whether to be a face image, while varying the position thereof each time by a predetermined distance on the resolution image selected by the resolution image selection section 32 based on the sub-window setting conditions provided by the detection control section 31.

For example, a sub-window for cutting out the partial image W with a predetermined size, i.e. 32×32 pixel size, is sequentially set on the selected resolution image by moving the position thereof each time by a predetermined distance, for example, by two pixels, and the cutout partial image W is inputted to the first discriminator group 34 or second discriminator group 35. The first discriminator group 34 and second discriminator group 35, as described later are respectively constituted by a plurality of different types of discriminators for discriminating whether the partial image W is a face image that includes a face with a predetermined inclination and orientation, and the discriminators are provided for each inclination and orientation of the face to be detected. Therefore, face images that include faces with various inclinations and orientations may be discriminated.

The first discriminator group 34 and the second discriminator group 35 are respectively constituted by a plurality of different types of discriminators for discriminating whether the partial image W is a face image that includes a face with a predetermined inclination and orientation, and discriminators are provided for each of the inclinations and orientations of the face to be detected.

Figure 6:
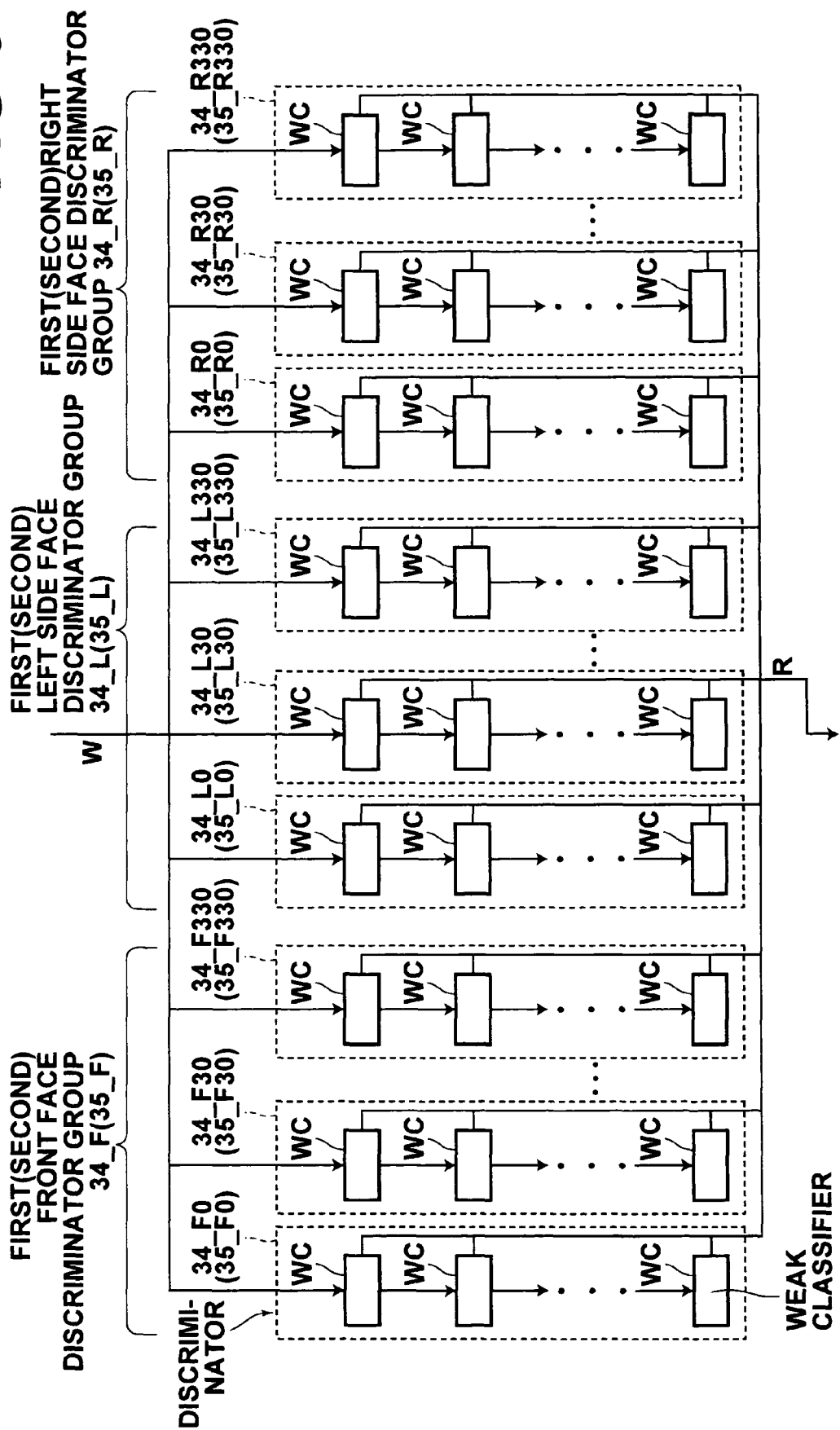
FIG. 6 is a block diagram of first and second discriminator groups, illustrating the schematic configuration thereof.

FIG. 6 is a block diagram of the first and second discriminator groups 34, 35, illustrating the schematic configuration thereof. As shown in FIG. 6, the first discriminator group 34 includes a plurality of different types of discriminator groups for discriminating faces with different orientations connected in parallel. That is, a first front face discriminator group 34_F for mainly discriminating front face images, a first left side face discriminator group 34_L for mainly discriminating left side face images, and a first right side face discriminator group 34_R for mainly discriminating right side face images are connected in parallel. Further, each of the three different types of discriminator groups includes 12 discriminators, each corresponding to each of the 12 inclinations of the face to be detected which differ by 30 degrees with each other with reference to the vertical direction of the partial image described above. More specifically, the first front face discriminator group 34_F includes discriminators 34_F0, 34_F30, - - -, and 34_F330, the first left side face discriminator group 34_L includes discriminators 34_L0, 34_L30, - - -, and 34_L330, and the first right side face discriminator group 34_R includes discriminators 34_R0, 34_R30, - - -, and 34_R330.

As shown in FIG. 6, the second discriminator group 35 includes a plurality of different types of discriminator groups for discriminating faces with different orientations connected in parallel, as in the first discriminator group 34. That is, a second front face discriminator group 35_F for mainly discriminating front face images, a second left side face discriminator group 35_L for mainly discriminating left side face images, and a second right side face discriminator group 35_R for mainly discriminating right side face images are connected in parallel. Further, each of the three different types of discriminator groups includes 12 discriminators, each corresponding to each of the 12 inclinations of the face to be detected which differ by 30 degrees with each other with reference to the vertical direction of the partial image, as in the first discriminator group 34. More specifically, the second front face discriminator group 35_F includes discriminators 35_F0, 35_F30, - - -, and 35_F330, the second left side face discriminator group 35_L includes discriminators 35_L0, 35_L30, - - -, and 35_L330, and the second right side face discriminator group 35_R includes discriminators 35_R0, 35_R30, - - -, and 35_R330.

As described above, the discriminators of the first discriminator group 34 and the second discriminator group 35 are both provided for discriminating whether the partial image is a face image. But, the properties of the discriminators differ with each other between the first discriminator group 34 and the second discriminator group 35. More specifically, the discriminators of the first discriminator group 34 have fewer detection failures arising from erroneous discrimination but requires a longer processing time for discrimination. On the other hand, the discriminators of the second discriminator group 35 have more detection failures arising from erroneous discrimination but the processing time for discrimination is shorter. This will be described in more detail later.

The first and second discriminator groups 34, 35 described above include discriminators for discriminating three different types of faces, front face, left side face, and right side face, as the face to be discriminated. But, discriminators for discriminating a right diagonal face and a left diagonal face as the face to be detected may be further provided in order to improve the detection accuracy for diagonally oriented faces.

In the mean time, the detection control section 31 has functions to select discriminators conditioned to discriminate a face with the inclination corresponding to the inclination of the face to be detected from the first discriminator group 34, and to input the partial image W cut out by the sub-window setting section 33 to the selected discriminators when the inclination of the face to be detected corresponds to the first inclination. Further, the detection control section 31 has functions to select discriminators conditioned to discriminate a face with the inclination corresponding to the inclination of the face to be detected from the second discriminator group 35, and to input the partial image W cut out by the sub-window setting section 33 to the selected discriminators when the inclination of the face to be detected corresponds to the second inclination.

Thus, the detection control section 31 and the first discriminator group 34 constitute a first detector for performing a first detection process. Likewise, the detection control section 31 and the second discriminator group 35 constitute a second detector for performing a second detection process. That is, the face detection section 30 functions as a detection means that includes two different types of detectors, namely the first detector for performing the first detection process and the second detector for performing the second detection process, for each inclination of the face to be detected, and selects and uses either of the two different types of detectors according to the inclination of the face to be detected.

As described above, the provision of two different types of detectors, the detector for performing the first detection process and the detector for performing the second detection process, for each inclination of the face to be detected allows a quick response to the case in which the first inclination changes in various ways. For example, in the case where a subject is imaged by a video camera through various camera works and a face detection process is performed real time on the recorded image, it may be possible to presume the first inclination where a relatively high face detection probability is expected based on the output signals of the sensor detecting the inclination of the video camera, but the first inclination may change with time. In such a case, if two different types of detectors are provided for each inclination of the face to be detected, such inclination changes may be handled by switching the two different types of detectors according to the inclination of the face to be detected.

Hereinafter, structure of each of the discriminators constituting the discriminator group, process flow within the discriminator, and a learning method of the discriminator will be described.

As shown in FIG. 6, each of the discriminator described above has a cascade structure in which a plurality of weak classifiers WC is connected in series. The cascade structure as used herein means a structure in which a plurality of weak classifiers WC that discriminates whether the partial image W is a face image is connected in series to perform the face discrimination in the following manner. That is, the face discrimination is performed sequentially from the top weak discriminator WC, and if the partial image W is discriminated to be a face image by all of the weak classifiers WC, then the partial image W is concluded to be a face image, while if the partial image W is discriminated to not be a face image by any weak classifier WC located partway in the structure, then the partial image W is concluded to be a non-face image and the discrimination process is terminated there.

Each of the weak classifiers WC calculates characteristic amounts according to a predetermined algorithm unique thereto, and calculates a score representing the probability that the partial image W includes a face with a predetermined inclination and orientation based on the characteristic amounts and a predetermined score table (histogram to be described later), then performs the discrimination described above depending on whether the score exceeds a predetermined threshold.

In the present embodiment, however, each of the weak classifiers WC uses two different thresholds. More specifically, each of the weak classifiers WC concludes the partial image W to be a face image if the calculated score exceeds a first threshold Th1, and terminates its operation, and if the calculated score falls below a second threshold Th2, which is smaller than the first threshold Th1, it concludes the partial image W to be a non-face image and terminates its operation. If the score corresponds to neither of them, it does not make any conclusion on grounds that there remains a possibility that the partial image W is a face image, and leaves the conclusion to the next weak classifier WC.

The weak classifiers constituting the discriminator in the first discriminator group 34 have a relatively low value set thereon for the second threshold Th2, while the weak classifiers constituting the discriminator in the second discriminator group 35 have a relatively high value set thereon for the second threshold Th2. Therefore, in the discriminator of the first discriminator group 34, it is highly likely that the score of the partial image W that includes a face which is relatively difficult to discriminate, i.e. low score partial image W, may exceeds the second threshold Th2. Consequently, it is highly likely that the partial image W is concluded to be a face image after passing through many weak classifiers WC. As a result, the discriminator of the first discriminator group 34 has a fewer discrimination failures arising from erroneous discrimination, but requires longer processing time for discrimination. In the discriminator of the second discriminator group 35, it is less likely that the score of such partial image W including a face which is relatively difficult to discriminate, i.e. low score partial image W, may exceeds the second threshold Th2. Consequently, it is highly likely that the partial image W is concluded to be a non-face image after passing through a fewer weak classifiers WC. As a result, the discriminator of the second discriminator group 35 has more discrimination failures arising from erroneous discrimination, but the processing time for discrimination is shorter.

Accordingly, the detection process using such discriminators has properties that when the threshold (second threshold Th2) of the weak classifiers WC is relatively low, the detection failures are relatively few but the processing time is long, and when the threshold (second threshold Th2) of the weak classifiers WC is relatively high, the detection failures are relatively great but the processing time is short.

Figure 7:
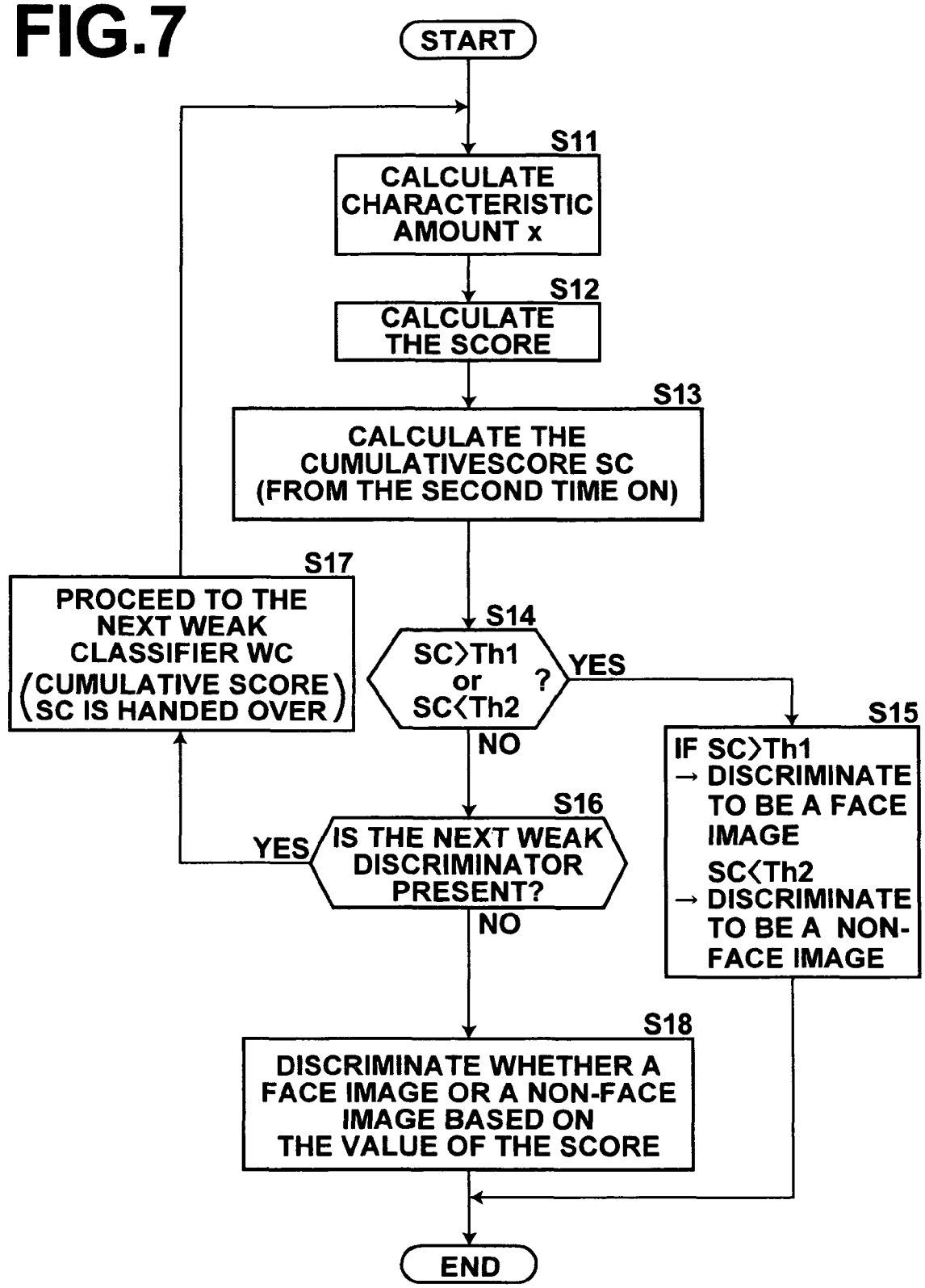
FIG. 7 is a drawing illustrating the process flow in the discriminators.
Figure 8:
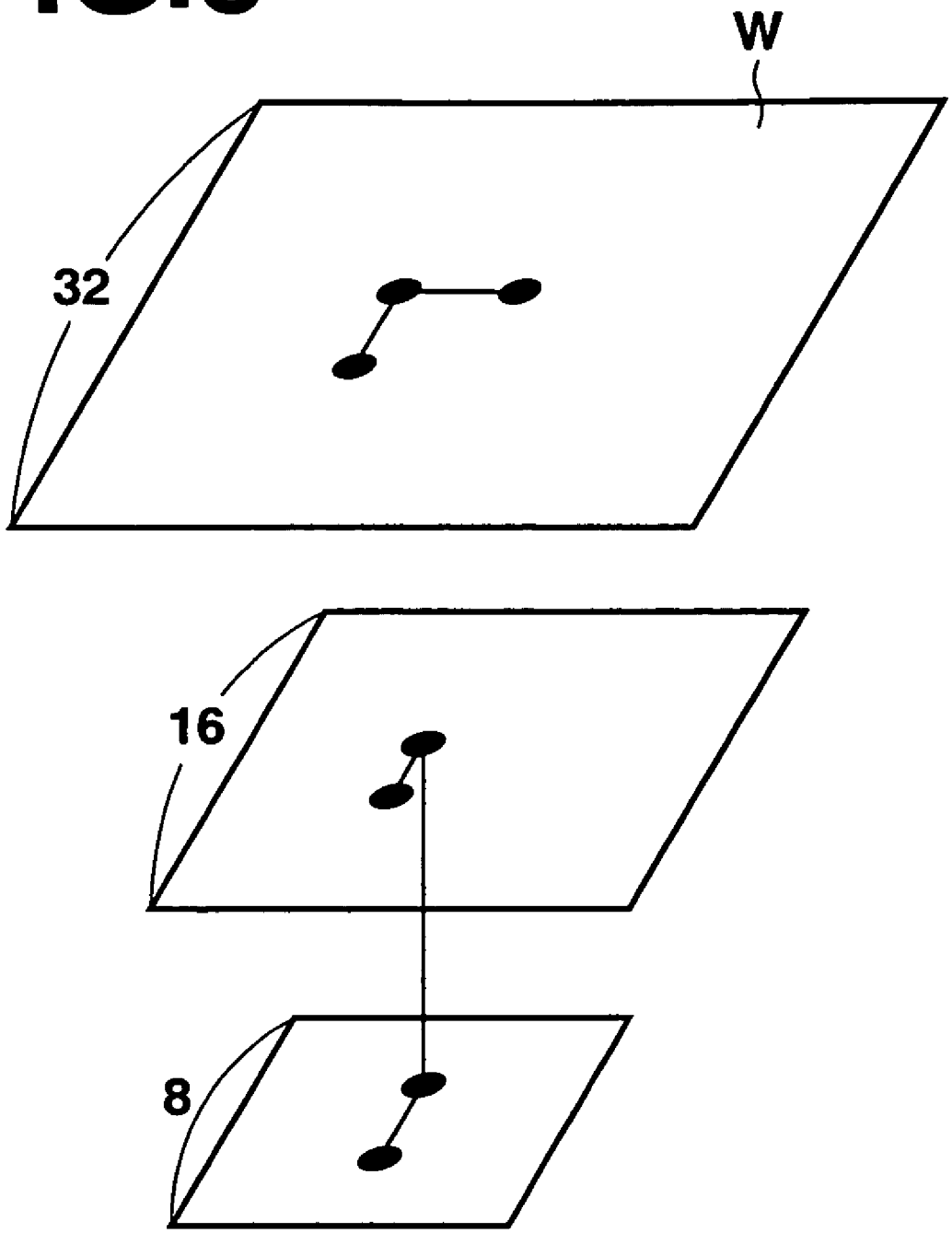
FIG. 8 is a drawing for explaining calculation of characteristic amounts in a weak classifier.

FIG. 7 is a flowchart illustrating the process flow within a single discriminator. When the partial image W is inputted to the discriminator, a characteristic amount x is calculated in the first weak classifier WC (step S11). For example, as shown in FIG. 8, a four adjacent pixel averaging process (in which an image is divided into a plurality of blocks of 2×2 pixel size, and the average value of the four pixel values in each block is calculated as the value of one pixel corresponding to the block) is performed step by step for the partial image W having a predetermined size, for example, 32×32 pixel size to obtain a 16×16 pixel size image, and a 8×8 pixel size image. Then, with predetermined two points, set within the plane of the three images including the original image, designated as a pair, the difference in pixel value (luminance) between the two points is calculated for each of the pairs constituting a pair group that includes a plurality of pairs, and combinations of the differences are designated as the characteristic amount. The predetermined two points of each of the pairs are, for example, predetermined two points in vertical or horizontal direction, which well reflect the contrasting density of the face in the image. Then the value corresponding to the combinations of the differences, i.e. the characteristic amount, is calculated as x. Thereafter, according to the value of x, the score representing the probability that the partial image W is the face to be discriminated (e.g., for discriminator 34_F30, a front face with the inclination corresponding to a rotation angle of 30 degrees) is obtained from a predetermined score table (step S12). Then, a cumulative score SC is obtained by adding the score to the score handed over from the immediately preceding weak classifier WC. The first weak classifier WC has no score to be handed over, so that the obtained score is deemed as the cumulative score SC (step S13). Then, a determination is made whether the cumulative score exceeds the predetermined threshold Th1 or falls below the predetermined threshold Th2 (step S14). That is, a determination is made whether the condition of either SC>Th1 or SC<Th2 is satisfied. If the condition of SC>Th1 is determined to be satisfied, the partial image W is discriminated to be a "face image" to be discriminated, and if the condition of SC<Th2 is determined to be satisfied, the partial image W is discriminated to be a "non-face image" and the process is terminated (step S15). In the mean time, if neither of the conditions is determined to be satisfied in step S14, a determination is made whether the next weak classifier WC is present (step S16), and if the determination result is positive, the cumulative score SC is handed over to the next weak classifier WC, and the process moves forward to the next weak classifier WC (step S17). On the other hand, if the step S16 is negative, the partial image W is discriminated to be either a "face image" or a "non-face" image based on the value of the calculated score, and the process is terminated (step S18).

Hereinafter, the learning (generation) method of the discriminator will be described.

Figure 9:
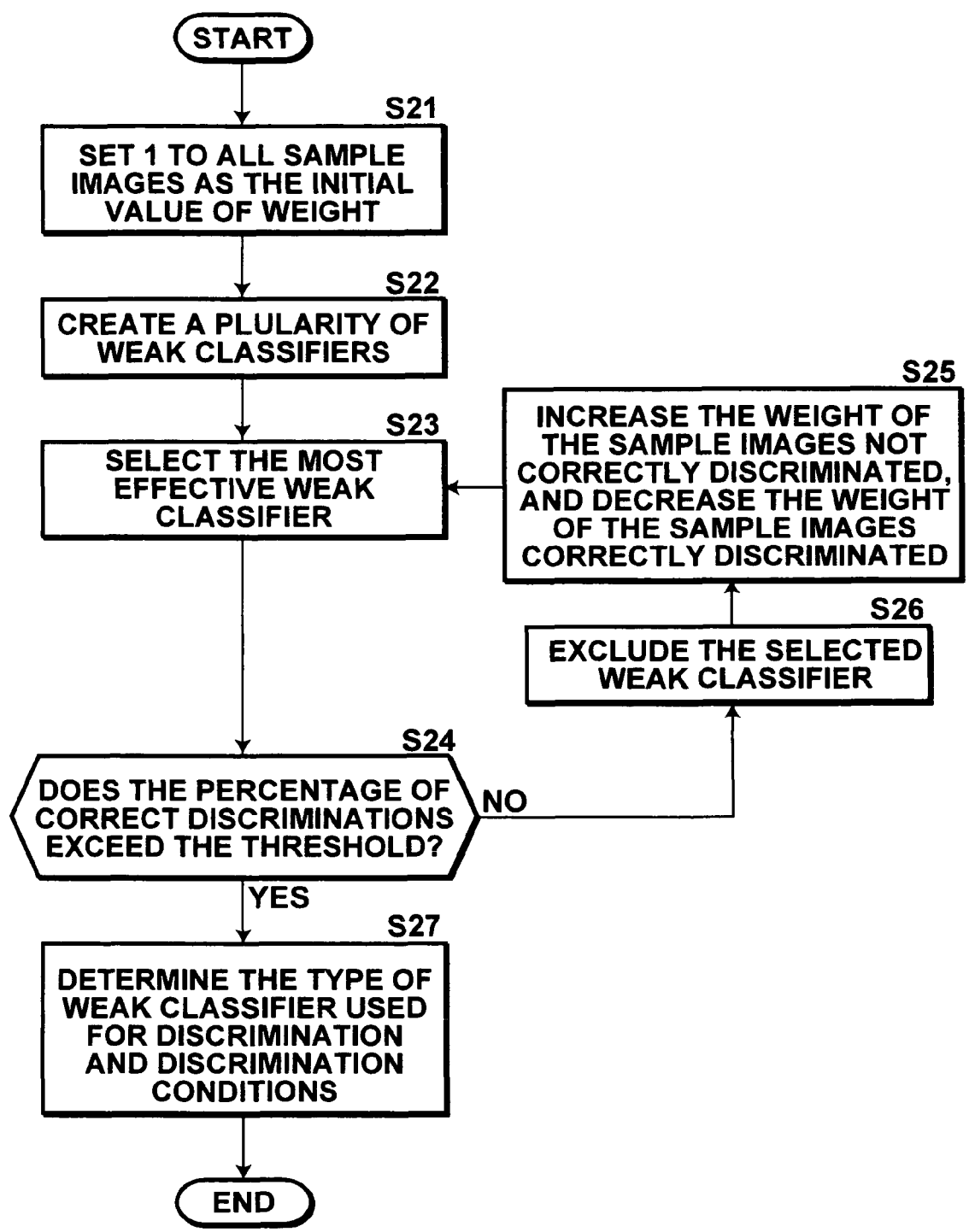
FIG. 9 is a flowchart illustrating the learning process of the discriminator.

FIG. 9 is a flowchart illustrating the learning method of the discriminator. In the learning of the discriminator, a plurality of sample images is used, which are standardized to a predetermined size, for example, 32×32 pixel size, and normalized in the same manner as that performed by the normalization section 20. As for the sample images, the following two sample image groups are provided. Namely, a face sample image group constituted by a plurality of different face sample images which are known to be of faces, and a non-face sample image group constituted by a plurality of different non-face sample images which are known to not be of faces.

Figure 10:
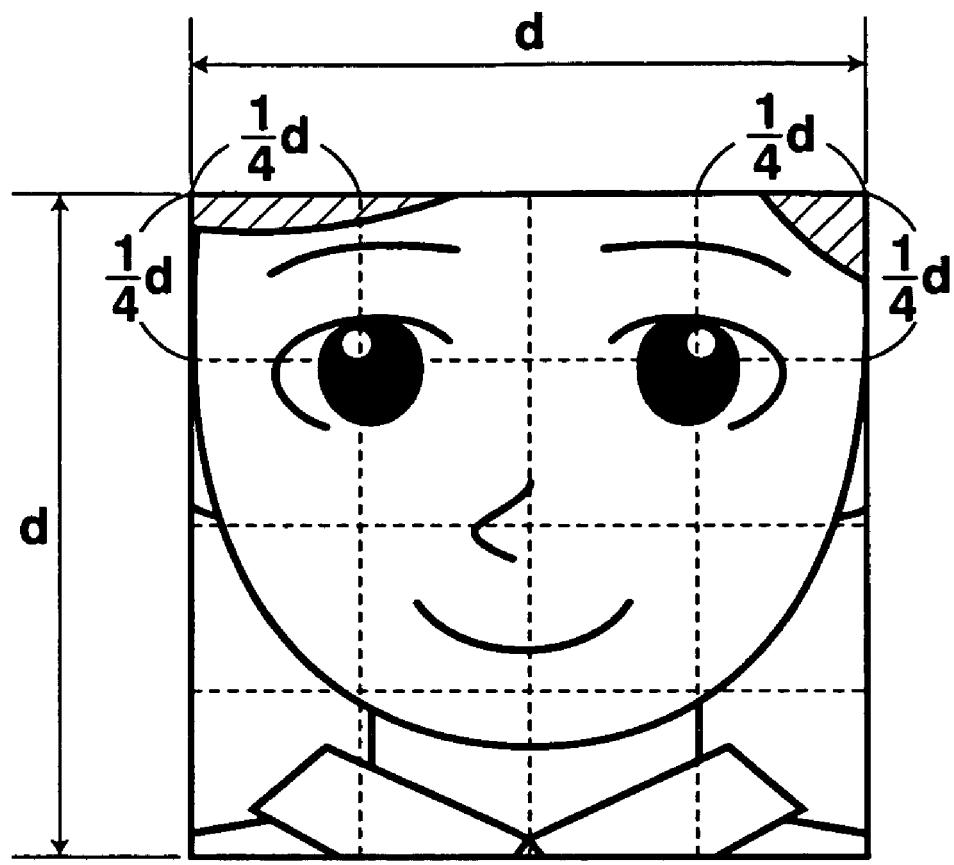
FIG. 10 is a drawing illustrating a sample face image normalized such that the eyes of the face are placed at predetermined positions.

In the face sample image group, for a single face sample image, a plurality of modified variations is used. These modified variations are obtained by enlarging/reducing the face sample image stepwise in the vertical and/or horizontal size in increments of 0.1 within a range of 0.7 to 1.2, and rotating each of the obtained sample images stepwise in the plane thereof in increments of three degrees within a range of ±15 degrees. Here, the face sample images are standardized in size and location of the faces so that the eyes are placed at predetermined positions, and the rotation in the plane and the enlargement/reduction described above are performed with reference to the positions of the eyes. For a sample image having a size of d×d, for example, the size and location of the face are standardized such that the eyes are positioned at places located inward by ¼d from the upper right corner and upper left corner respectively as shown in FIG. 10. Further, the rotation in the plane and the enlargement/reduction described above are performed centered around the midpoint of the eyes.

A weight or importance is allocated to each of these sample images. First, the initial value of the weight for each of the sample images is set equally to 1 (step S21).

Then, with predetermined two points set in the plane of the sample images and their reduced images designated as a pair, a plurality of different types of pair groups, each constituted by a plurality of pairs, is set to generate a weak classifier for each of the plurality of different types of pair groups (step S22). Here, each of the weak classifiers provides a criterion for discriminating between a face image and a non-face image. It uses combinations of the difference in pixel value (luminance) between predetermined two points of each pair set in the plane of the partial image cut out by the sub-window W and its reduced images when creating a pair group constituted by a plurality of pairs with the predetermined two points designated as the pair. In the present embodiment, a histogram of the combinations of the difference in pixel value between predetermined two points of each of the pairs constituting a pair group is used as the basis of the score table of the weak classifier.

Figure 11:
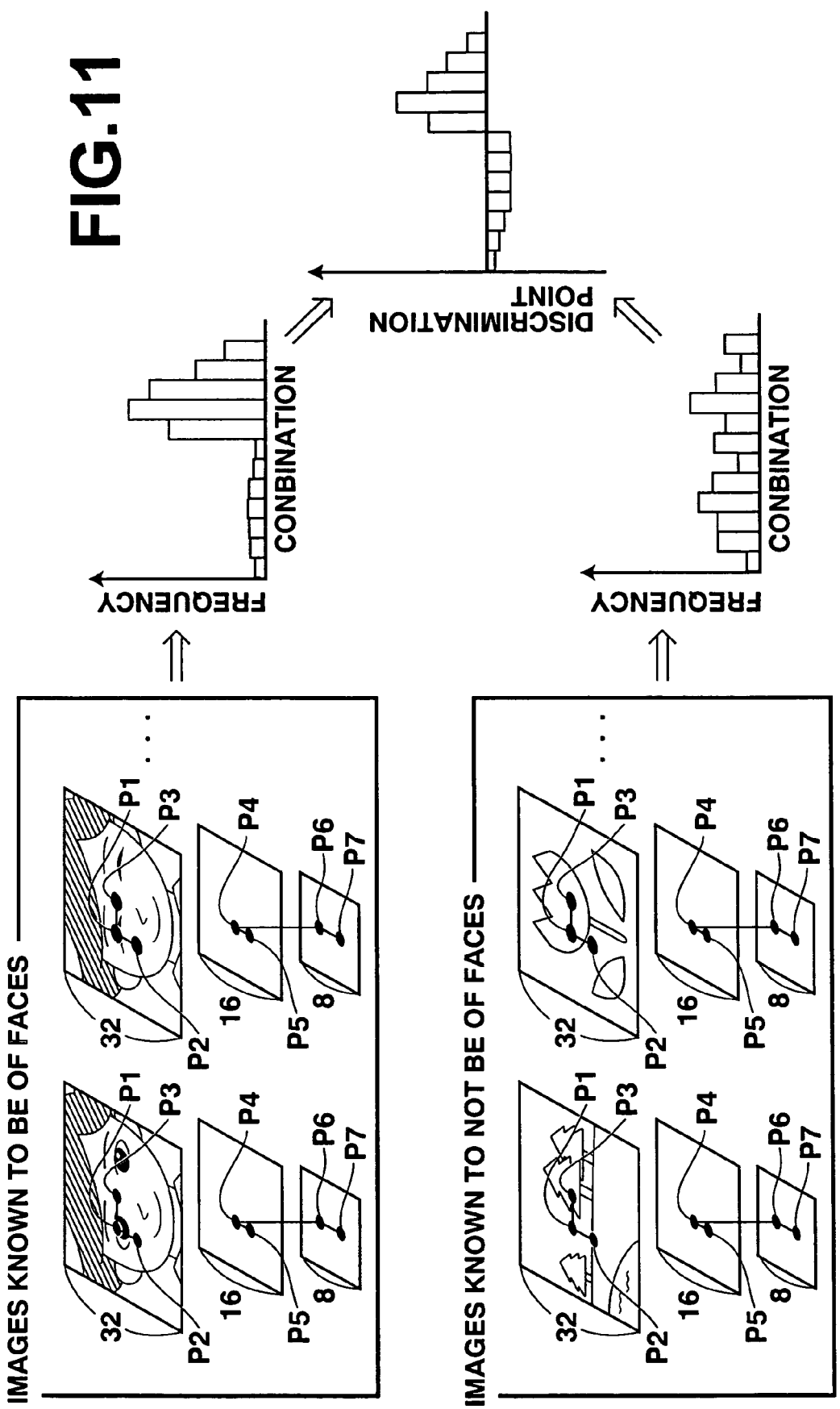
FIG. 11 is a drawing illustrating a method in which a histogram of the weak classifier is derived.

FIG. 11 is a drawing illustrating a method in which a histogram is generated. As illustrated in the sample images at the left side of FIG. 11, the pair group for generating the discriminator is constituted by the five pairs of points P1-P2, P1-P3, P4-P5, P4-P6 and P6-P7. Here, the point P1 is at the center of the right eye, point P2 is within the right cheek, and point P3 is within the forehead of a plurality of sample images which are known to be of faces. The point P4 is at the center of the right eye, and point P5 is within the right cheek of the sample images reduced to 16×16 pixel size by the four adjacent pixel averaging process. The point P6 is within the forehead, and point P7 is at the mouth of the sample images further reduced to 8×8 pixel size by the four adjacent pixel averaging process. Note that the coordinates of the two points of each of the pairs constituting a pair group for generating a discriminator are the same in all of the sample images. Then, the combinations of the difference in pixel value between the two points of each of the pairs constituting the five pairs are obtained for all of the sample images which are known to be of faces and the histogram thereof is created. Here, the number of possible combinations of the difference in pixel value is dependent upon the number of luminance gradations of an image, and if, for example, a 16 bit gradation image is assumed, the number of combinations of the difference for a single pixel value is 65536, totaling the number of gradations raised to the power of the number of pairs, i.e., 65536 raised to the power of 5, which would require great amounts of samples, time, and memory for learning and detection. For this reason, in the present embodiment, the difference in pixel value is delimited by a suitable numerical range and quantized to n-narize the difference (e.g., N=100). This reduces the number of combinations of the difference in pixel value to n raised to the power of 5, so that the number of data representing the combinations of the difference in pixel value may be reduced.

Likewise, a histogram of the non-face sample image group is created. For the non-face sample images, positions corresponding to the predetermined two positions of each pair of the face sample images are used (which are given the same reference symbols of P1 to P7). Logarithms of the ratios of the frequencies in the two histograms are represented by the rightmost histogram illustrated in FIG. 11, which is used as the basis of the score table of a weak classifier. Hereinafter, each value of the vertical scale of the histogram of the weak classifier is referred to as the discrimination point. According to this weak classifier, images that have distributions of combinations of the difference in pixel value corresponding to positive discrimination points therein are highly likely to be of faces. The likelihood that an image is of a face increases with an increase in the absolute values of the discrimination points. On the other hand, images that have distributions of the combinations of the difference in pixel value corresponding to negative discrimination points are highly likely to not be of faces. Again, the likelihood that an image is not of a face increases with an increase in the absolute values of the negative discrimination points. In step 22, a plurality of weak classifiers in histogram format are generated for combinations of the difference in pixel value between the predetermined two points of each of the pairs constituting a plurality of different types of pair groups which are regarded as useful for discrimination.

Thereafter, a weak classifier, which is most effective in discriminating whether an image is of a face, is selected from the plurality of weak classifiers generated in step S22. The selection of the most effective weak classifier is performed by taking the weighting of each sample image into consideration. In this example, the percentages of correct discriminations provided by each of the weak classifiers are compared, and the weak classifier having the highest weighted percentage of correct discriminations is selected (step S23). Initially, in step S23, the weight of all of the sample images is set equal to 1. Therefore, the weak classifier that correctly discriminates whether sample images are of faces with the highest frequency is selected as the most effective weak classifier. The weight of each of the sample images is renewed at step S25, to be described later and the process returns to step S23. Therefore, in step S23 at second time, there are sample images weighted with 1, those weighted with a value less than 1, and those weighted with a value greater than 1. Accordingly, during evaluation of the percentage of correct discriminations, a sample image, which has a weight greater than 1, is counted more than a sample image, which has a weighting of 1. For these reasons, from the second and subsequent step S23's, more importance is placed on correctly discriminating heavily weighted sample images than lightly weighted sample images.

Next, confirmation is made regarding whether the percentage of correct discriminations of selected weak classifiers exceeds a predetermined threshold (step S24). That is, the weak classifiers which have been selected are combined (not necessarily be connected linearly in the learning stage) to confirm if the percentage of discrimination results regarding whether sample images are of faces that match the actual sample images is compared against the predetermined threshold. Here, the sample images, which are employed in the evaluation of the percentage of correct discriminations of the weak classifiers, may be those that are weighted with different values, or those that are equally weighted. In case that the percentage of correct discriminations exceeds the predetermined threshold, whether an image is of a face can be discriminated by the selected weak classifiers with sufficiently high accuracy, therefore the learning process is completed. In the case that the percentage of correct discriminations is less than or equal to the predetermined threshold, the process proceeds to step S26, to select an additional weak classifier, to be employed in combination with the weak classifiers which have been selected thus far.

In step S26, the weak classifier, which has been selected at the immediately preceding step S23, is excluded from the selection in step S6, so that it is not selected again.

Next, the weight of sample images, which were not correctly discriminated by the weak classifier selected at the immediately preceding step S23, is increased, and the weight of sample images, which were correctly discriminated, is decreased (step S25). The reason for increasing and decreasing the weight in this manner is to place more importance on images which were not correctly discriminated by the weak classifiers that have been selected thus far. In this manner, selection of a weak classifier which is capable of correctly discriminating whether these sample images are of a face is encouraged, thereby improving the effect of the combination of weak classifiers.

Thereafter, the process returns to step S23, and another effective weak classifier is selected, using the weighted percentages of correct discriminations as a reference.

The above steps S23 through S6 are repeated to select weak classifiers corresponding to combinations of the difference in pixel value between two points of each of the pairs constituting a specific pair group, which are suited for discriminating whether faces are included in images. If the percentages of correct discriminations, which are evaluated at step S24, exceed the threshold, the type of weak classifier and discrimination conditions, which are to be employed in discrimination regarding whether images include faces, are determined (step S27), and the learning is completed. The selected weak classifiers are linearly connected in descending order of the weighted percentages of correct discriminations, thereby one discriminator is formed. Further, a score table for calculating the score according to the combinations of the difference in pixel value is generated for each of the weak classifiers based on the obtained histogram. Here, the histogram itself may be used as the score table, and in this case the discrimination points of the histogram are directly used as the score.

In the manner as described above, the discriminators are generated through the learning using the face sample images and non-face sample images. In order to generate a plurality of different types of discriminators for discriminating faces having different inclinations and orientations as described above, a plurality of different types of face sample image groups, each corresponding to each of the inclinations and orientations of faces, are provided, and the learning is performed for each type of face sample image group using the face sample image group and a non-face sample image group.

That is, in the present embodiment, a total number of 36 different types of face sample image groups are provided. Namely, three face orientations of front, left side, and right side, and twelve face inclinations provided by rotating the face in increments of 30 degrees from 0 to 330 degrees.

After the plurality of different types of face image groups is obtained, and the learning is performed for each type of face sample image group using the face sample image group and a non-face sample image group. Thereby, the bases of 36 different types of discriminators constituting the first and second discriminator groups 34, 35 are generated. Thereafter, the second threshold Th2 of the bases, i.e. weak classifiers of each discriminator is adjusted to generate the discriminators constituting the first discriminator group 34 and the second discriminator group 35.

Note that in the case that the learning technique described above is applied, the weak classifiers are not limited to those in the histogram format. The weak classifiers may be of any format, as long as they provide references to discriminate between face images and non-face images by using combinations of the difference in pixel value between predetermined two points of each of the pairs constituting a particular pair group. Examples of alternative weak classifiers are: binary data, thresholds, functions, and the like. As a further alternative, a histogram that represents the distribution of the difference between the two histograms illustrated in the center of FIG. 11 may be employed, in the case that the weak classifiers are of the histogram format.

The learning technique is not limited to that described above. Other machine learning techniques, such as a neural network technique, may be employed.

The duplicate detection determination section 40 determines whether a face image S2 detected from each resolution image is a face image representing the same face in the detection target image S0 and detected in duplication from a plurality of resolution images, which are adjacent in resolution with each other, based on the positional relationship. If the plurality of face images is determined to be detected in duplication, it merges the plurality of face images into a single face image and outputs a true face image S3 without duplication.

When obtaining a plurality of resolution images by performing the multi-resolution process on the detection target image S0, the resolution gap between the adjacent resolution images should not be great in order to prevent face image detection failures. Further, the discriminator has normally a certain allowable range in size for the face which may be discriminated. In such a case, the same face in the detection target image S0 may sometimes be detected from a plurality of adjacent resolution images in duplication. The process performed in the duplicate detection determination section 40 is a process for eliminating such duplication and obtaining accurate detection results.

Hereinafter, the process flow of the face detection system 1 according to the first embodiment will be described.

Figure 12A:
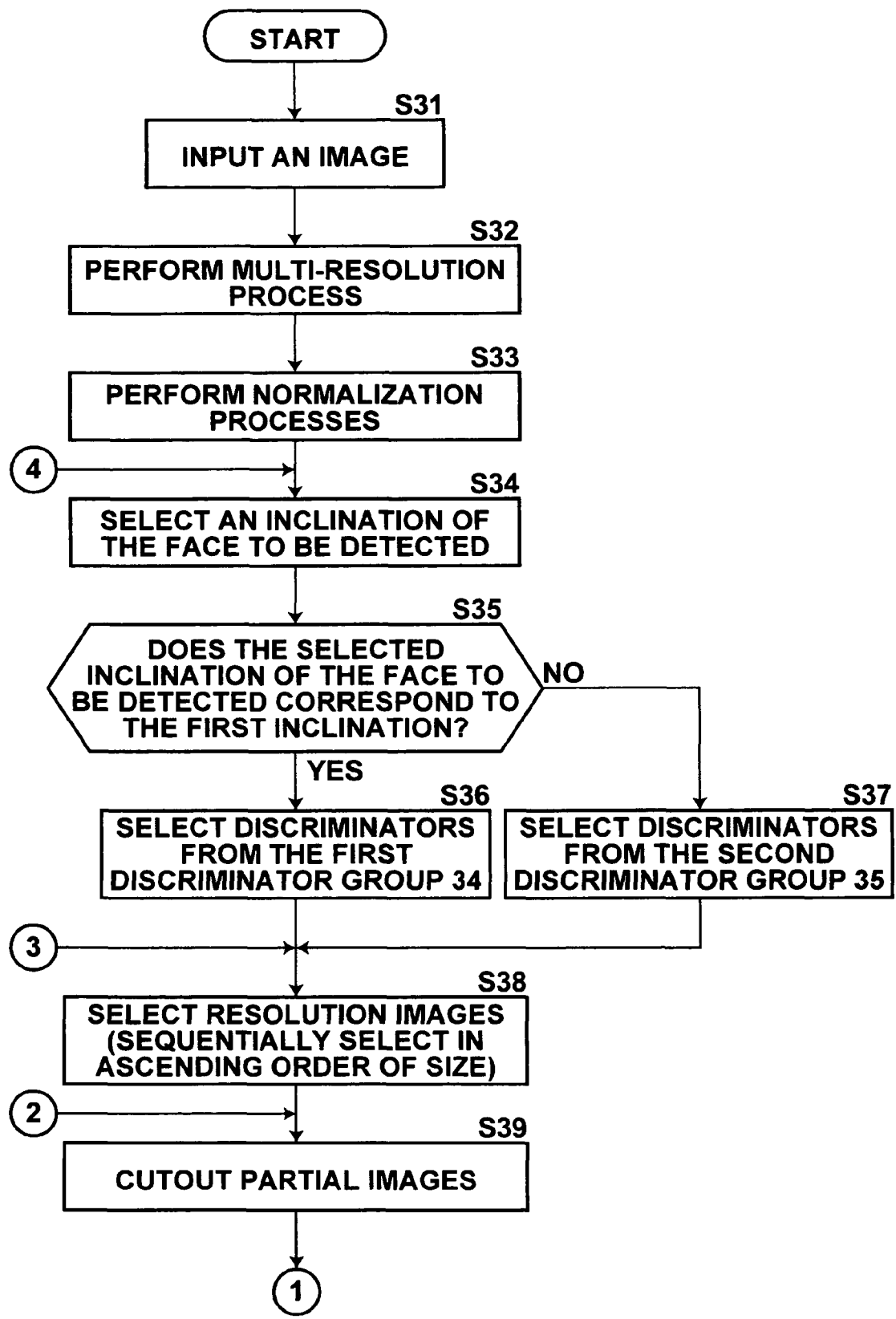
FIG. 12A is a flowchart illustrating the process performed in the face detecting system 1 according to a first embodiment (first half).

FIGS. 12A, 12B are a flowchart illustrating the flow of the process performed in the face detection system 1. As shown in the flowchart, when a detection target image S0 is supplied to the multi-resolutioning section 10 (step S31), an image S0' is generated, which is the detection target image S0 transformed into a predetermined size, and a resolution image group S1 constituted by a plurality of resolution images reduced in size (resolution) in stepwise, every time by $2^{-1/3}$ times from the image S0' (step S32). Then, in the normalization section 20, the overall normalization process and the local normalization process described above are performed on each of the resolution images of the resolution image group S1 to obtain a normalized resolution image group S1' (step S33).

In the face detection section 30, one of the inclinations of the face to be detected is selected first by the detection control section 31 according to a predetermined order (step S34). Then, determination is made whether the selected inclination of the face to be detected corresponds to the first inclination, i.e., the vertical or horizontal direction of the detection target image S0 (step S35). If the determination result is positive, the discriminators conditioned to discriminate a face with the inclination corresponding to the inclination of the selected face to be detected are selected from the first discriminator group 34 (step S36). If the determination result is negative, the discriminators conditioned to discriminate a face with the inclination corresponding to the inclination of the selected face to be detected are selected from the second discriminator group 35 (step S37). For example, if the inclination of the face to be detected corresponds to an inclination rotated by 30 degrees with reference to the vertical direction of the detection target image S0, three discriminators of 34F_30, 34L_30, and 34R_30 are selected.

Then, one of the resolution images, which is the target image for face image detection, is selected by the resolution image selection section 32 from the resolution image group S1' in ascending order of size, i.e., in the order of S1'_$n$, S1'_$n$–1, - - - S1'_1 (step S38).

A sub-window is set on the selected resolution image by the sub-window setting section 33 by moving the sub-window every time at a predetermined distance, for example, at a distance of two pixels, to sequentially cut out partial images W having a predetermined size (step S39), which are inputted to the selected discriminators. The inputted partial image W is discriminated by each of the selected discriminators whether it is a face image (step S40), and the discrimination result R is obtained by the detection control section 31.

A determination is made by the detection control section 31 whether the currently cut out partial image W is the last partial image of the currently selected resolution image, i.e., whether there is no other partial image to be cut out next from the currently selected resolution image (step S41). If the determination is negative, the process returns to step S39 to cut out a new partial image W from the currently selected resolution image, and the detection process is continued. On the other hand, if the determination result is positive, a determination is made, as the next step, whether the current resolution image is the last resolution image, i.e., whether there is no other resolution image to be selected next (step S42). If the determination result is negative, the process returns to step S38 to select a new resolution image, and the detection process is continued. On the other hand, if the determination result is positive, a determination is made, as the next step, whether the current inclination is the last inclination of the face to be detected, i.e., whether there no other face inclination to be selected (step S43). If the determination result is negative, the process returns to step S34 to select the face inclination to be selected next, and the detection process is continued. On the other hand, if the determination result is positive, the detection process is terminated.

Then, finally, a process for merging the face images detected in duplication among the detected face images S2 into a single face image is performed by the duplicate detection determination section 40, and a true face image S3 detected from the detection target image S0 is outputted therefrom.

FIG. 13 illustrates the process in which resolution images are selected in ascending order of size, partial images W are cut out from each of the resolution images, and face detections are performed by repeating the steps from step S38 to step S42.

Figure 14:
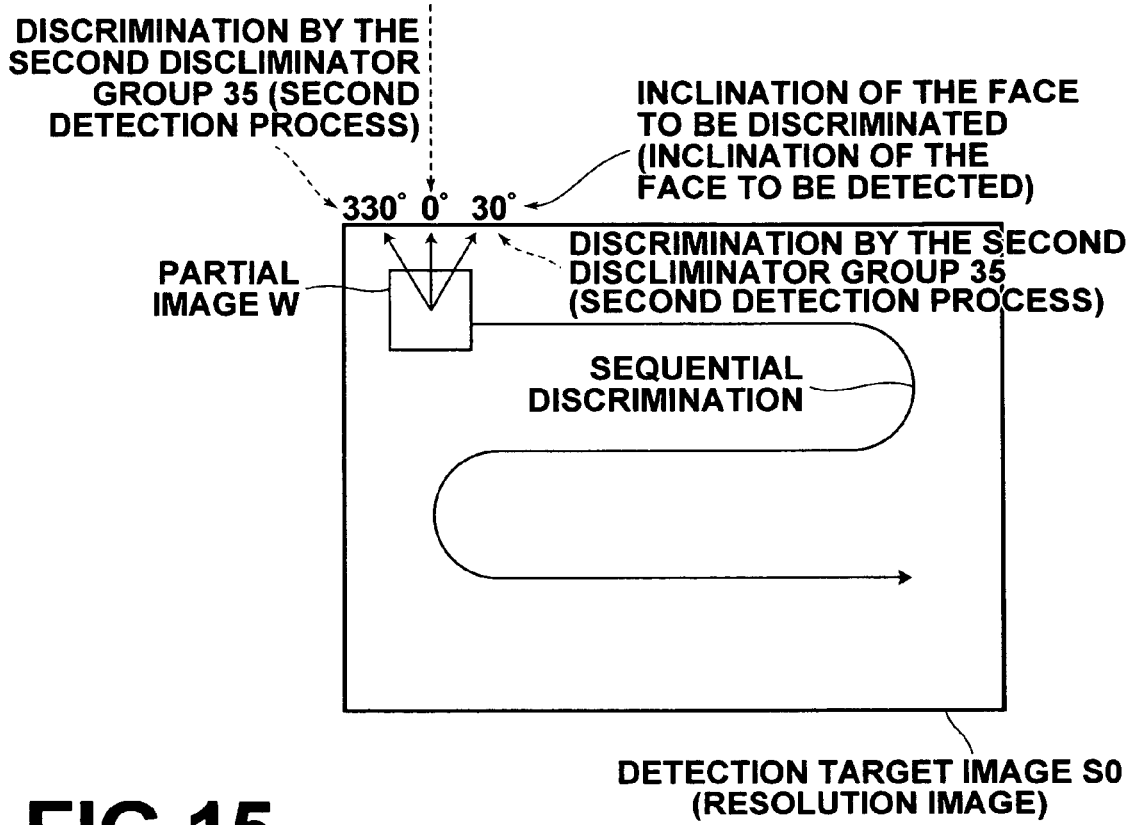
FIG. 14 is a conceptual drawing illustrating a process in which the types of detection processes are changed according to the inclination of the face to be detected.

FIG. 14 is a conceptual drawing illustrating a process in which the types of detection processes are changed according to the inclination of the face to be detected when the face detection process is performed by the face detection system 1 on a resolution image S1'_$i$ obtained by changing the resolution of a detection target image S0 and performing a normalization process thereon. That is, for inclinations corresponding to the vertical and horizontal directions of a detection target image S0, i.e., four inclinations of 0, 90, 180, and 270 degrees with reference to the vertical direction of the detection target image S0 on each of the partial images W sequentially cut out from a resolution image, the first detection process having a relatively high face detection probability (fewer detection failures) and a relatively long processing time, i.e., the detection process using the discriminators of the first discriminator group 34 is performed, since a relatively high face detection probability is expected in these inclinations compared with the other inclinations according to the empirical rule. For other inclinations, where a relatively low face detection probability is expected, the second detection process having a relatively low face detection probability (more detection failures) and a relatively short processing time, i.e., the detection process using the discriminators of the second discriminator group 35 is performed.

As described above, according to the face detection system 1, which is a first embodiment of the face detection apparatus of the present invention, in the face detection process in which a face included in the input detection target image is detected by use of at least two inclinations of the face to be detected, the first detection process having a relatively high face detection probability and a relatively long processing time is performed if the inclination of the face to be detected corresponds to the first inclination where a relatively high face detection probability is expected, and the second detection process having a relatively low face detection probability and a relatively short processing time is performed if the inclination of the face to be detected is other than the first inclination. Thus, the detection process having a relatively long processing time and relatively fewer detection failures may be concentrated on the conditions where a relatively high face detection probability is expected, so that the face detection probability may be increased with reduced processing time as much as possible.

Hereinafter, another face detection system, which is a second embodiment of the face detection apparatus of the present invention, will be described.

The face detection system 1 according to the second embodiment has the same structure as that of the face detection system according to the first embodiment shown in FIG. 1, and the function of each section constituting the face detection system is substantially the same, but there is a slight difference in the process of the face detection section 30. That is, in the first embodiment, either the first or second detection process is selected by the face detection section 30 according to the inclination of the face to be detected. But, in the second embodiment, either the first or second detection process is selected by the face detection section 30 according to the position of the face to be detected on a detection target image so.

More specifically, by controlling each of the sections, the detection control section 31 causes the first detection process having a relatively high face detection probability (fewer detection failures) and a relatively long processing time to be performed if the position of the face to be detected (on a partial image W cut out by the sub-window setting section 33) corresponds to a first position where a relatively high face detection probability is expected according to the empirical rule, and the second detection process having a relatively low detection probability (more detection failures) and a relatively short processing time to be performed if the position of the face to be detected is other than the first position (hereinafter, the second position).

Figure 15:
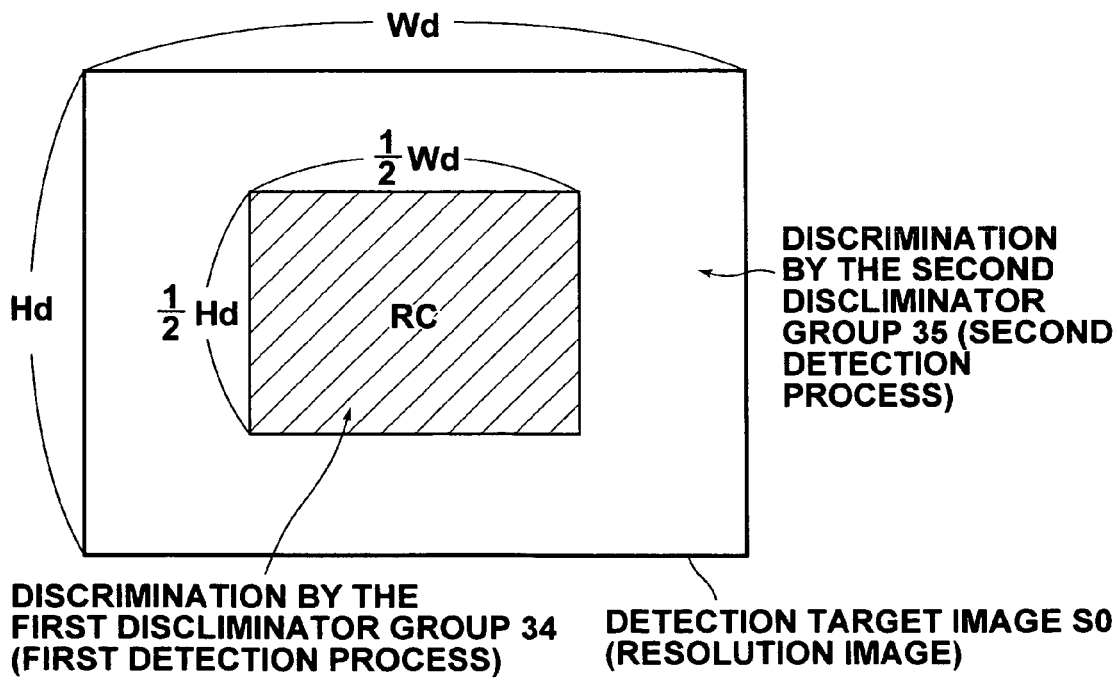
FIG. 15 is a drawing illustrating the central region RC of a face detection target image S0 where a relatively high face detection probability is expected.

Although various positions may be considered as the first position, it is assumed here to be a position within a predetermined region of the detection target image S0 including the center thereof. More specifically, the first position is within a central region RC, which has the vertical width and horizontal width reduced to ½ of the vertical width and horizontal width of the detection target image S0 respectively with its center corresponding to that of the detection target image S0, as shown in FIG. 15. The reason is that, in general, a photograph image or the like in which a person is imaged as the subject, the face of the subject is often placed at a position adjacent to the central region of the image, thus the probability that a face is detected from such a position may be considered to be higher than the other positions.

Hereinafter, the process flow of the face detection system 1 according to the second embodiment will be described.

FIGS. 16A, 16B are a flowchart illustrating the flow of the process performed in the face detection system 1. As shown in the flowchart, when a detection target image S0 is supplied to the multi-resolutioning section 10 (step S51), an image S0' is generated, which is the detection target image S0 transformed into a predetermined size, and a resolution image group S1 constituted by a plurality of resolution images reduced in size (resolution) in stepwise, every time by $2^{-1/3}$ times from the image S0' (step S52). Then, in the normalization section 20, the overall normalization process and the local normalization process described above are performed on each of the resolution images of the resolution image group S1 to obtain a normalized resolution image group S1' (step S53).

In the face detection section 30, one of the inclinations of the face to be detected is selected first by the detection control section 31 according to a predetermined order (step S34). Then, one of the resolution images, which is the target image for face image detection, is selected by the resolution image selection section 32 from the resolution image group S1' in ascending order of size, i.e., in the order of S1'_n, S1'_n–1, - - - S1'_1 (step S55).

A sub-window is set on the selected resolution image by the sub-window setting section 33 by moving the sub-window every time at a predetermined distance, for example, at a distance of two pixels, to sequentially cut out partial images W having a predetermined size (step S56). Here, a determination is made by the detection control section 31 whether the center position of the cutout partial image W corresponds to the first position, i.e. a position within the central region RC (step S57). If the determination result is positive, the discriminators conditioned to discriminate a face with the inclination corresponding to the inclination of the selected face to be detected are selected from the first discriminator group 34 (step S58). If the determination result is negative, the discriminators conditioned to discriminate a face with the inclination corresponding to the inclination of the selected face to be detected is selected from the second discriminator group 35 (step S59). For example, if the inclination of the face to be detected corresponds to an inclination rotated by 30 degrees with reference to the vertical direction of the detection target image S0, three discriminators of 34F_30, 34L_30, and 34R_30 are selected.

Then, the partial image W is inputted to the selected discriminators, and discriminated by each of the selected discriminators whether it is a face image (step S60), and the discrimination result R is obtained by the detection control section 31.

A determination is made by the detection control section 31 whether the currently cut out partial image W is the last partial image of the currently selected resolution image, i.e., whether there is no other partial image to be cut out next from the currently selected resolution image (step S61). If the determination result is negative, the process returns to step S56 to cut out a new partial image W from the currently selected resolution image, and the detection process is continued. On the other hand, if the determination result is positive, a determination is made, as the next step, whether the current resolution image is the last resolution image, i.e., whether there no other resolution image to be selected next (step S62). If the determination result is negative, the process returns to step S55 to select a new resolution image, and the detection process is continued. If the determination result is positive, a determination is made, as the next step, whether the current inclination is the last inclination of the face to be detected, i.e., whether there is no other face inclination to be selected (step S63). If the determination result is negative, the process returns to step S54 to select the face inclination to be selected next, and the detection process is continued. On the other hand, if the determination result is positive, the detection process is terminated.

Then, finally, a process for merging the face images detected in duplication among the detected face images S2 into a single face image is performed by the duplicate detection determination section 40, and a true face image S3 detected from the detection target image S0 is outputted therefrom.

As described above, according to the face detection system, which is a second embodiment of the face detection apparatus of the present invention, in the face detection process in which a face included in the inputted detection target image is detected while varying the position of the face to be detected, the first detection process having a relatively high face detection probability and a relatively long processing time is performed if the position of the face to be detected corresponds to the first position where a relatively high face detection probability is expected, and the second detection process having a relatively low face detection probability and a relatively short processing time is performed if the position of the face to be detected is other than the first position. Thus, the detection process having a relatively long processing time with relatively fewer detection failures may be concentrated on the conditions where a relatively high face detection probability is expected, so that the face detection probability may be increased with reduced processing time as much as possible.

In the second embodiment, the first position is defined as in the central region of an image. According to the empirical rule that when the lens, for example, of a digital camera or the like is focused, it is highly likely that a face is located at the focused position. Alternatively, therefore, a position within a predetermined region centered around the focused position may be defined as the first position.

In the first and second embodiments described above, each of the weak classifiers constituting each of the discriminators of the first discriminator group 34 and each of the weak classifiers constituting each of the discriminators of the second discriminator group 35 uses a different threshold (second threshold Th2) with each other for the score used for discriminating whether the partial image W is a non-face image. Alternatively, different face sample image groups may be used for the learning of the discriminators of the first discriminator group 34 and the discriminators of the second discriminator group 35. For example, a face sample image group which is relatively difficult to discriminate is used for the learning of the discriminators of the first discriminator group 34, and a face sample image group which is relatively easy to discriminate is used for the learning of the discriminators of the second discriminator group 35. Then, from the face sample image group which is relatively difficult to discriminate, a discriminator which is highly likely to be able to discriminate faces which are difficult to be discriminated with more weak classifiers may be formed. That is, a discriminator having fewer detection failures and a relatively long processing time may be formed. On the other hand, from the face sample image group which is relatively easy to discriminate, a discriminator that may discriminate faces which are easy to discriminate in a short time may be formed. That is, a discriminator having relatively more detection failures and a relatively short processing time may be formed.

Figure 17:
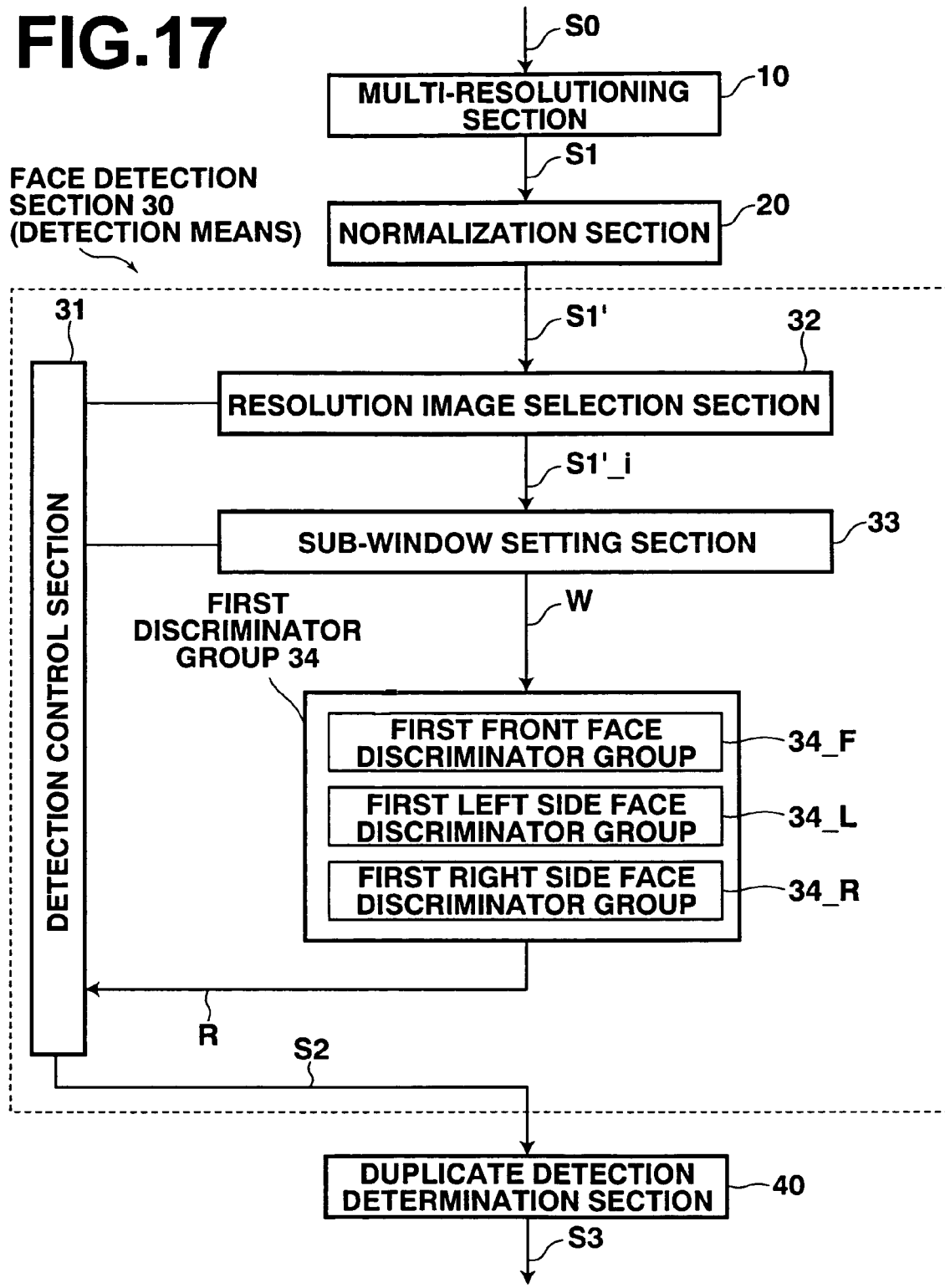
FIG. 17 is a block diagram of the face detection system 1 illustrating a second example of the configuration thereof.

Further, in the first and second embodiments, the types of detection processes are changed by changing the types of the discriminator groups used for discriminating whether the partial image W is a face image according to the inclination or position of the face to be detected. Alternatively, for example, a configuration may be adopted in which only a single type of discriminators is provided as shown in FIG. 17, and the amount of variance of the face to be detected, i.e. the moving distance when the partial images W are sequentially cut out from a resolution image by the sub-window setting section 33, is changed according to the inclination or position of the face to be detected. More specifically, when the inclination of the face to be detected corresponds to the first inclination, or the position of the face to be detected corresponds to the first position, the detection process may be performed by setting the amount of moving distance relatively small (first detection process), and when the inclination of the face to be detected corresponds to the second inclination, or the position of the face to be detected corresponds to the second position, the detection process may be performed by setting the amount of moving distance relatively large (second detection process).

Still further, for example, the amount of variance in the size of the face to be detected, i.e., the amount of variance in the resolution of the resolution images may be changed according to the inclination or position of the face to be detected when the resolution images are sequentially selected by the resolution image selection section 32. More specifically, when the inclination of the face to be detected corresponds to the first inclination, or the position of the face to be detected corresponds to the first position, the detection process may be performed by setting the amount of variance in the resolution of the resolution images relatively small (first detection process), and when the inclination of the face to be detected corresponds to the second inclination, or the position of the face to be detected corresponds to the second position, the detection process may be performed by setting the amount of variance in the resolution of the resolution images relatively large (second detection process).

As described above, the embodiments, in which the spatially dense detection process is used as the first detection process and the spatially coarse detection process is used as the second detection process, may also concentrate the detection process having a relatively long processing time and relatively fewer detection failures on the conditions where a relatively high face detection probability is expected, so that the face detection probability may be increased with reduced processing time as much as possible, as in the first and second embodiments.

Still further, in the face detection process in which a face included in the detection target image is detected while varying the size of the face to be detected, the first detection process having relatively fewer detection failures and a relatively long processing time may be performed if the size of the face to be detected corresponds to a first size where a relatively high face detection probability is expected, and the second detection process having more detection failures and a relatively short processing time may be performed if the size of the face to be detected is other than the first size.

For example, when an image is taken by a digital camera with the imaging mode set to "portrait", it is highly likely that the digital photograph image obtained by the digital camera include a relatively large face. Thus, if the information indicating that the imaging mode of the digital camera was "portrait" at the time of imaging is obtained from the information recorded in the digital camera, or from the tag information of the digital photograph image, the first size described above may be defined as a size that exceeds a predetermined size, for example, ¼ of the image.

Each of the face detection systems according to the embodiments described above may be built into a digital camera, and the face information obtained thereby may be used for camera control.

In the embodiments described above, in the case where a predetermined number of faces included in the detection target image are detected, performance of the detection process by giving priority to the conditions where a relatively high face detection probability is expected may further facilitate to speed up the processing.

So far the face detection systems according to the embodiments of the present invention have been described. A program for causing a computer to execute each of the processes of the sections corresponding to the face detection apparatus of the present invention within the face detection systems is also one of the embodiments of the present invention. Further, a computer readable recording medium having such a program recorded thereon is also one of the embodiments of the present invention.

What is claimed is:

1. A face detection method for detecting a face included in an input image by use of at least two inclinations of the face to be detected, wherein a first detection process is performed, if the inclination of the face to be detected corresponds to a first inclination where a relatively high face detection probability is expected, otherwise a second detection process having a relatively low face detection probability and a relatively short processing time compared with the first detection process is performed, if the inclination of the face to be detected is other than the first inclination, wherein the method is performed using a processor or a computer.

2. The face detection method according to claim 1, wherein the first inclination is an inclination substantially corresponding to the vertical or horizontal direction of the input image.

3. The face detection method according to claim 2, wherein:

each of the first and second detection processes uses a discriminator that comprises a plurality of different types of weak classifiers connected in cascade for cutting out a partial image at the position of the face to be detected, calculating an index value that indicates the probability that the partial image is a face image based on the characteristic amounts of the image of the partial image, and discriminating whether the partial image is a face image based on a threshold for the index value, to discriminate whether the partial image is a face image; and the first detection process is a detection process with a relatively low threshold for the index value, and the second detection process is a detection process with a relatively high threshold for the index value.

4. The face detection method according to claim 1, wherein:

two different types of detectors, a first detector for performing the first detection process, and a second detector for performing the second detection process, are provided in advance for each inclination of the face to be detected; and either the first or second detection process is performed by selecting and using either of the two different types of detectors according to the inclination of the face to be detected.

5. The face detection method according to claim 4, wherein:

each of the first and second detection processes uses a discriminator that comprises a plurality of different types of weak classifiers connected in cascade for cutting out a partial image at the position of the face to be detected, calculating an index value that indicates the probability that the partial image is a face image based on the characteristic amounts of the image of the partial image, and discriminating whether the partial image is a face image based on a threshold for the index value, to discriminate whether the partial image is a face image; and the first detection process is a detection process with a relatively low threshold for the index value, and the second detection process is a detection process with a relatively high threshold for the index value.

6. The face detection method according to claim 1, wherein:

each of the first and second detection processes performs detection while varying the position of the face to be detected on the input image every time by a predetermined amount of variance;

the first detection process is a detection process with a relatively small amount of variance in the position of the face to be detected; and the second detection process is a detection process with a relatively large amount of variance in the position of the face to be detected.

7. The face detection method according to claim 1, wherein:

each of the first and second detection processes performs detection while varying the size of the face to be detected every time by a predetermined amount of variance; the first detection process is a detection process with a relatively small amount of variance in the size of the face to be detected; and the second detection process is a detection process with a relatively large amount of variance in the size of the face to be detected.

8. The face detection method according to claim 1, wherein:

each of the first and second detection processes uses a discriminator that comprises a plurality of different types of weak classifiers connected in cascade for cutting out a partial image at the position of the face to be detected, calculating an index value that indicates the probability that the partial image is a face image based on the characteristic amounts of the image of the partial image, and discriminating whether the partial image is a face image based on a threshold for the index value, to discriminate whether the partial image is a face image; and the first detection process is a detection process with a relatively low threshold for the index value, and the second detection process is a detection process with a relatively high threshold for the index value.

9. A face detection method in which an input image is scanned to enable the change in face detection processes according to the position of the face to be detected, wherein a first detection process is performed, if the position of the face to be detected corresponds to a first position where a relatively high face detection probability is expected, otherwise a second detection process having a relatively low face detection probability and a relatively short processing time compared with the first detection process is performed, if the position of the face to be detected is other than the first position, wherein the method is performed using a processor or a computer.

10. The face detection method according to claim 9, wherein the first position is a position within a predetermined region of the input image including the center thereof.

11. The face detection method according to claim 10, wherein:

each of the first and second detection processes uses a discriminator that comprises a plurality of different types of weak classifiers connected in cascade for cutting out a partial image at the position of the face to be detected, calculating an index value that indicates the probability that the partial image is a face image based on the characteristic amounts of the image of the partial image, and discriminating whether the partial image is a face image based on a threshold for the index value, to discriminate whether the partial image is a face image; and the first detection process is a detection process with a relatively low threshold for the index value, and the second detection process is a detection process with a relatively high threshold for the index value.

12. The face detection method according to claim 9, wherein:

each of the first and second detection processes performs detection while varying the position of the face to be detected every time by a predetermined amount of variance; the first detection process is a detection process with a relatively small amount of variance in the position of the face to be detected; and the second detection process is a detection process with a relatively large amount of variance in the position of the face to be detected.

13. The face detection method according to claim 9, wherein:

each of the first and second detection processes performs detection while varying the size of the face to be detected every time by a predetermined amount of variance; the first detection process is a detection process with a relatively small amount of variance in the size of the face to be detected; and the second detection process is a detection process with a relatively large amount of variance in the size of the face to be detected.

14. The face detection method according to claim 9, wherein:
- each of the first and second detection processes uses a discriminator that comprises a plurality of different types of weak classifiers connected in cascade for cutting out a partial image at the position of the face to be detected, calculating an index value that indicates the probability that the partial image is a face image based on the characteristic amounts of the image of the partial image, and discriminating whether the partial image is a face image based on a threshold for the index value, to discriminate whether the partial image is a face image; and
- the first detection process is a detection process with a relatively low threshold for the index value, and the second detection process is a detection process with a relatively high threshold for the index value.

15. A face detection apparatus for detecting a face included in an input image by use of at least two inclinations of the face to be detected, the apparatus comprising a detector module to perform a first detection process, if the inclination of the face to be detected corresponds to a first inclination where a relatively high face detection probability is expected, otherwise a second detection process having a relatively low face detection probability and a relatively short processing time compared with the first detection process, if the inclination of the face to be detected is other than the first inclination.

16. The face detection apparatus according to claim 15, wherein the first inclination is an inclination substantially corresponding to the vertical or horizontal direction of the input image.

17. The face detection apparatus according to claim 16, wherein:
- each of the first and second detection processes uses a discriminator that comprises a plurality of different types of weak classifiers connected in cascade for cutting out a partial image at the position of the face to be detected, calculating an index value that indicates the probability that the partial image is a face image based on the characteristic amounts of the image of the partial image, and discriminating whether the partial image is a face image based on a threshold for the index value, to discriminate whether the partial image is a face image; and
- the first detection process is a detection process with a relatively low threshold for the index value, and the second detection process is a detection process with a relatively high threshold for the index value.

18. The face detection apparatus according to claim 15, wherein:
- the detection means includes two different types of detectors, a first detector for performing the first detection process, and a second detector for performing the second detection process; and
- either the first or second detection process is performed by selecting and using either of the two different types of detectors according to the inclination of the face to be detected.

19. The face detection apparatus according to claim 18, wherein:
- each of the first and second detection processes uses a discriminator that comprises a plurality of different types of weak classifiers connected in cascade for cutting out a partial image at the position of the face to be detected, calculating an index value that indicates the probability that the partial image is a face image based on the characteristic amounts of the image of the partial image, and discriminating whether the partial image is a face image based on a threshold for the index value, to discriminate whether the partial image is a face image; and
- the first detection process is a detection process with a relatively low threshold for the index value, and the second detection process is a detection process with a relatively high threshold for the index value.

20. The face detection apparatus according to claim 15, wherein:
- each of the first and second detection processes performs detection while varying the position of the face to be detected on the input image every time by a predetermined amount of variance; the first detection process is a detection process with a relatively small amount of variance in the position of the face to be detected; and the second detection process is a detection process with a relatively large amount of variance in the position of the face to be detected.

21. The face detection apparatus according to claim 15, wherein:
- each of the first and second detection processes performs detection while varying the size of the face to be detected every time by a predetermined amount of variance; the first detection process is a detection process with a relatively small amount of variance in the size of the face to be detected; and the second detection process is a detection process with a relatively large amount of variance in the size of the face to be detected.

22. The face detection apparatus according to claim 15, wherein:
- each of the first and second detection processes uses a discriminator that comprises a plurality of different types of weak classifiers connected in cascade for cutting out a partial image at the position of the face to be detected, calculating an index value that indicates the probability that the partial image is a face image based on the characteristic amounts of the image of the partial image, and discriminating whether the partial image is a face image based on a threshold for the index value, to discriminate whether the partial image is a face image; and
- the first detection process is a detection process with a relatively low threshold for the index value, and the second detection process is a detection process with a relatively high threshold for the index value.

23. A face detection apparatus that performs detection by scanning an input image and changing the position of the face to be detected on the input image, the apparatus comprising a detection module to perform a first detection process, if the position of the face to be detected corresponds to a first position where a relatively high face detection probability is expected, otherwise a second detection process having a relatively low face detection probability and a relatively short processing time compared with the first detection process, if the position of the face to be detected is other than the first position.

24. The face detection apparatus according to claim 23, wherein the first position is a position within a predetermined region of the input image including the center thereof.

25. The face detection apparatus according to claim 24, wherein:
- each of the first and second detection processes uses a discriminator that comprises a plurality of different types of weak classifiers connected in cascade for cutting out a partial image at the position of the face to be detected, calculating an index value that indicates the probability that the partial image is a face image based on the characteristic amounts of the image of the partial image, and discriminating whether the partial image is a face image based on a threshold for the index value, to discriminate whether the partial image is a face image; and the first detection process is a detection process with a relatively low threshold for the index value, and the second detection process is a detection process with a relatively high threshold for the index value.

26. The face detection apparatus according to claim 23, wherein:

each of the first and second detection processes performs detection while varying the position of the face to be detected every time by a predetermined amount of variance;

the first detection process is a detection process with a relatively small amount of variance in the position of the face to be detected; and the second detection process is a detection process with a relatively large amount of variance in the position of the face to be detected.

27. The face detection apparatus according to claim 23, wherein:

each of the first and second detection processes performs detection while varying the size of the face to be detected every time by a predetermined amount of variance;

the first detection process is a detection process with a relatively small amount of variance in the size of the face to be detected; and the second detection process is a detection process with a relatively large amount of variance in the size of the face to be detected.

28. The face detection apparatus according to claim 23, wherein:

each of the first and second detection processes uses a discriminator that comprises a plurality of different types of weak classifiers connected in cascade for cutting out a partial image at the position of the face to be detected, calculating an index value that indicates the probability that the partial image is a face image based on the characteristic amounts of the image of the partial image, and discriminating whether the partial image is a face image based on a threshold for the index value, to discriminate whether the partial image is a face image; and the first detection process is a detection process with a relatively low threshold for the index value, and the second detection process is a detection process with a relatively high threshold for the index value.

29. A computer readable recording medium on which a program for causing a computer to function as a face detection apparatus stored thereon or embodied therein for detecting a face included in an input image by use of at least two inclinations of the face to be detected, wherein the program causes the computer to function as a detection means performing a first detection process if the inclination of the face to be detected corresponds to a first inclination where a relatively high face detection probability is expected, otherwise a second detection process having a relatively low face detection probability and a relatively short processing time compared with the first detection process, if the inclination of the face to be detected is other than the first inclination.

30. A computer readable recording medium on which a program for causing a computer to function as a face detection apparatus stored thereon or embodied therein in which an input image is scanned to enable the change in face detection processes according to the position of the face to be detected, wherein the program causes the computer to function as a detection means performing a first detection process if the position of the face to be detected corresponds to a first position where a relatively high face detection probability is expected, otherwise a second detection process having a relatively low face detection probability and a relatively short processing time compared with the first detection process, if the position of the face to be detected is other than the first position.

* * * * *